United States Patent
Bartels

(10) Patent No.: US 6,408,112 B1
(45) Date of Patent: Jun. 18, 2002

(54) OPTICAL SWITCH AND MODULAR SWITCHING SYSTEM COMPRISING OF OPTICAL SWITCHING ELEMENTS

(75) Inventor: Frank Bartels, Dortmund (DE)

(73) Assignee: Bartels Mikrotechnik GmbH, Dortmund (DE)

(*) Notice: Subject to any disclaimer, the term of this patent is extended or adjusted under 35 U.S.C. 154(b) by 0 days.

(21) Appl. No.: 09/623,808
(22) PCT Filed: Sep. 16, 1999
(86) PCT No.: PCT/EP99/01519
  § 371 (c)(1),
  (2), (4) Date: Sep. 8, 2000
(87) PCT Pub. No.: WO99/46624
  PCT Pub. Date: Sep. 16, 1999

(30) Foreign Application Priority Data

Mar. 9, 1998 (DE) .......................................... 198 09 975
Aug. 17, 1998 (DE) .......................................... 298 14 622

(51) Int. Cl.[7] .............................. G02B 6/26; G02B 6/42
(52) U.S. Cl. .............................. 385/16; 385/18; 385/19
(58) Field of Search ........................................ 385/16–19

(56) References Cited

U.S. PATENT DOCUMENTS 5,732,168 A * 3/1998 Donald ........................ 385/16
5,761,352 A * 6/1998 Kitajima et al. .............. 385/16

* cited by examiner

*Primary Examiner*—Hemang Sanghavi
*Assistant Examiner*—Scott A Knauss
(74) *Attorney, Agent, or Firm*—Kanesaka & Takeuchi

(57) ABSTRACT

An optical component comprises channels in which liquids of suitable refractive index are arranged. By displacing the liquids within the channels by means of suitable actuators, the light is optionally led through the liquid. By selecting a suitable refractive index, light beams may be deflected at any desired angles. In a miniaturized embodiment, light beams can be controlled at high frequencies. In a light-conducting basic body, suitable cavities are connected to channels, and arranged in the channels is a liquid with a refractive index which essentially corresponds to the refractive index of the basic body. By means of piezoelectric actuators, which are arranged on the cavities, the liquid is displaced into the channels. As a result, light which leads through the basic body is deflected in optionally two different directions, and an optical switch is provided.

10 Claims, 17 Drawing Sheets

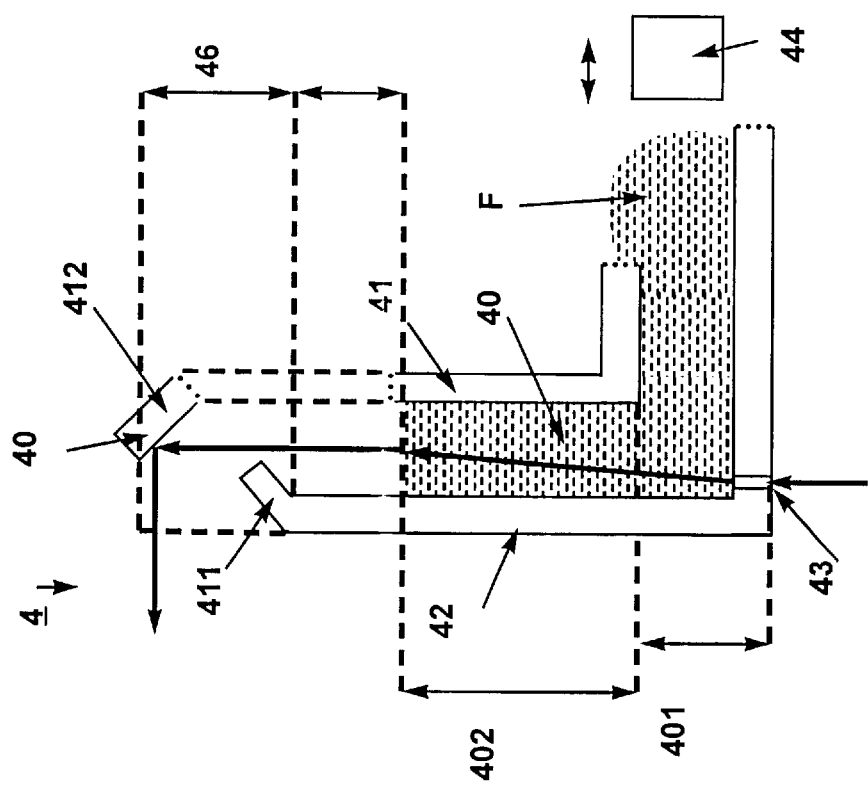
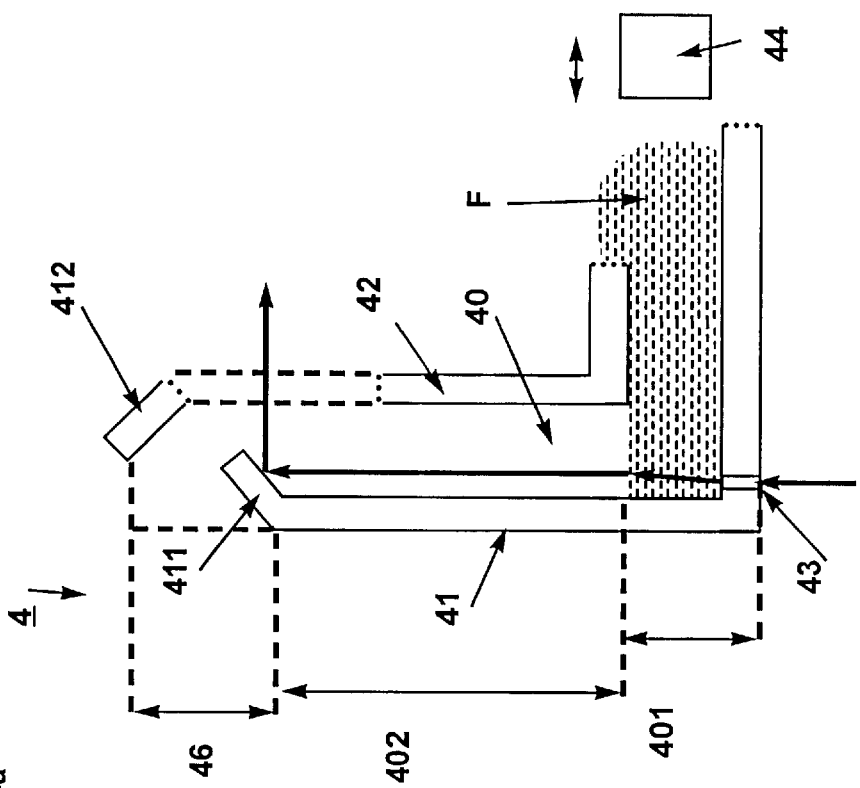
Fig. 4b
Fig. 4a

OPTICAL SWITCH AND MODULAR SWITCHING SYSTEM COMPRISING OF OPTICAL SWITCHING ELEMENTS

This application is a 371 of PCT/EP99/01519 filed Sep. 16, 1999.

BACKGROUND OF THE INVENTION

In general, a multiplicity of variable optical functions are implemented with optical components. One example is optical isolators in chip designs, which are transparent to light beams only in one direction. By means of optical components, light beams are relatively frequently controlled in such a way that they are deflected at an angle. For example, optical scanners exist in which light beams can be conducted over an area by rotating mirrors. A further example is optical relay circuits, which make it possible to couple the path of the light in a polymer or glass fiber optionally into different branches.

Conventional optical components of this type have previously been implemented either by means of mechanical/micromechanical elements (tiltable mirrors or moving lenses/beam splitters etc.) or by the use of optical materials that can be controlled electrically, magnetically or thermally.

However, because of their complexity, the abovementioned conventional mechanical embodiments, in particular if miniaturized, can be produced only with great difficulty, and are therefore very expensive and demand an unsatisfactorily high amount of energy, even in a miniaturized embodiment. When tiltable mirrors are used, for example, in addition the maximum deflection angle of the light beam to be controlled is limited to less than 30° in conventional optical components.

The use of optical substances that can be controlled electrically, magnetically or thermally requires the suitable selection of very specific and very expensive materials, for which reason conventional optical components of this type are undesirably expensive. In addition, such materials suitable for optical control have only a limited temperature stability and are therefore unreliable in terms of their mode of operation.

SUMMARY OF THE INVENTION

In view of the above disadvantages of the prior art, the object of the present invention is to provide optical components which are suitable for controlling light beams and can be produced simply and cheaply, even in mass production and in miniaturized form, and can be constructed for any desired deflection angle of light beams.

BRIEF DESCRIPTION OF THE DRAWINGS

According to the invention, the above object is achieved by the features of the independent claim 1. Advantageous embodiments of the present invention emerge without any restriction from the features of the subclaims and/or the following description, which is accompanied by schematic drawings, in which:

FIGS. 4a) and b) show a fourth embodiment of the present invention;

DETAILED DESCRIPTION

First Embodiment

Figure 1B:
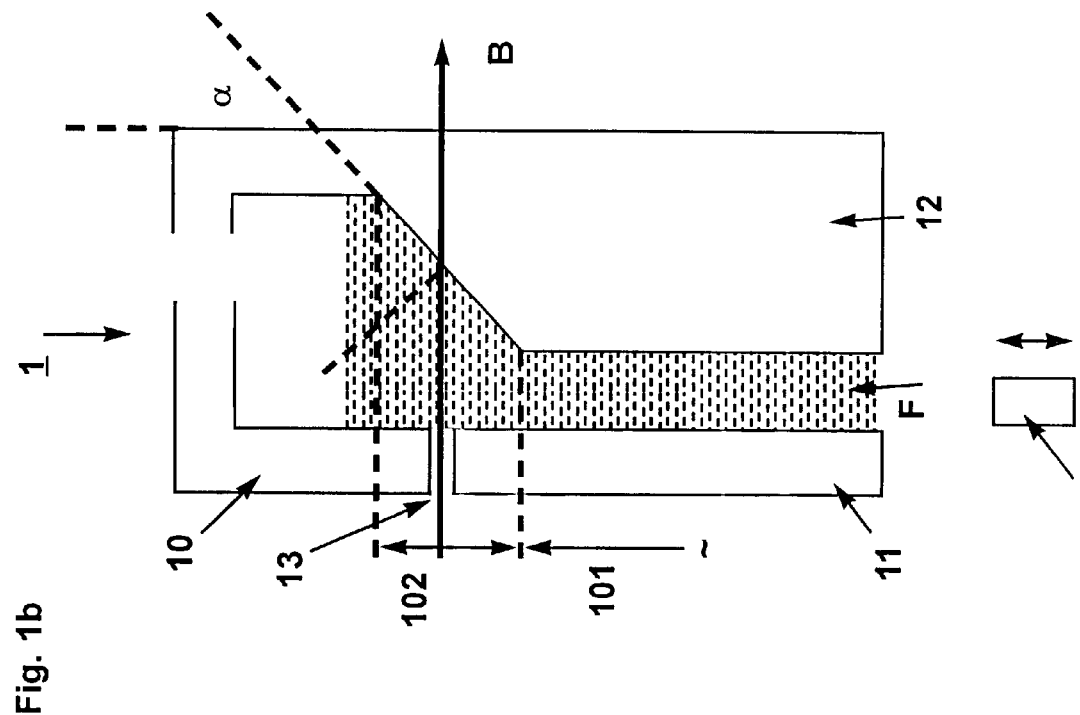
FIGS. 1a) and b) show a first embodiment of the present invention.
Figure 1A:
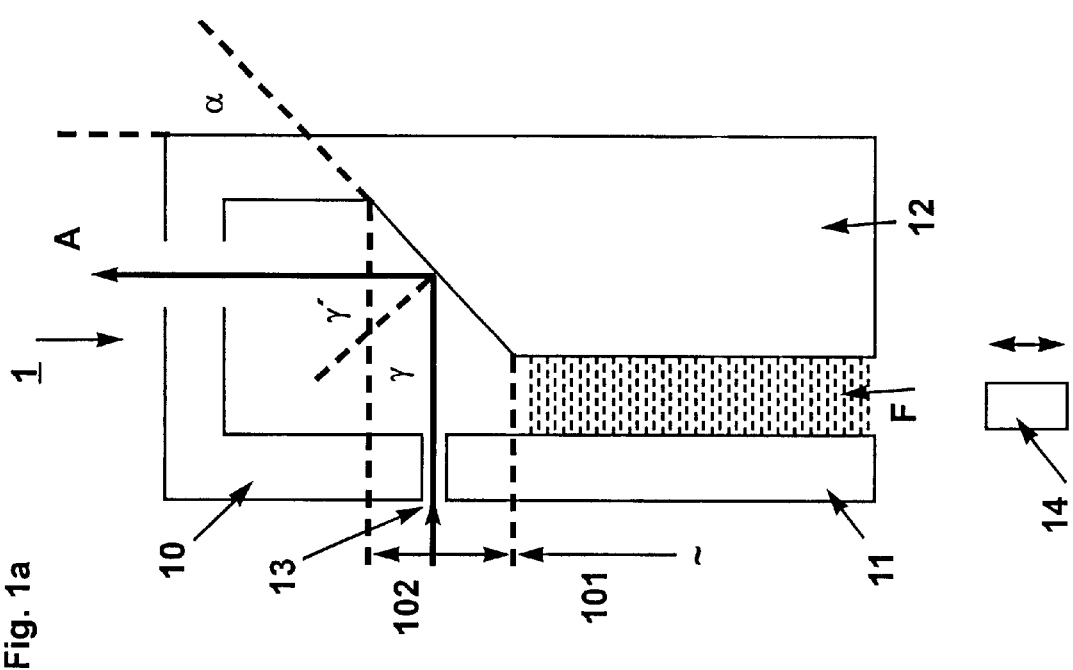

FIG. 1 shows a first advantageous exemplary embodiment of the present invention, using which the present invention will be explained schematically by way of example.

FIG. 1 shows a longitudinal section through a plastic body of an optical component 1, in which an internal cavity 10 is formed. In its sections which are essential for the invention, the cavity comprises a first section 101 and a second section 102. In addition, the cavity 10 has a first 11 and second 12 opposite side wall, which bounds the first 101 and second 102 sections at the sides.

The first section 101 of the cavity 10 is used as a reservoir for a liquid F, which is introduced into the cavity and partially fills the latter.

The second section 102 of the cavity 10, which adjoins the first section 101, has, like the first section 101, the opposite side walls 11 and 12, the side wall 12 in the area of the second section 102 of the cavity being formed at a first angle $\alpha$ to the side wall 11.

Formed in the first side wall 11, at an angle $\beta$ to the first side wall, is a fiber guide trench 13, through which a light-conducting fiber is inserted in such a way that light is directed by the light-conducting fiber onto the side wall 12. If, then, light directed by the light-conducting fiber onto the side wall 12 is deflected, the light falls onto the side wall 12 at an angle of incidence $\gamma$ corresponding to the selected angles $\alpha$ and $\beta$, and is reflected from the side wall 12 at an angle $\gamma'$. By means of appropriately designing the side walls 11 and 12 in terms of their angular position $\alpha$ in relation to each other, and by appropriately introducing the fiber guide trench at a predetermined angle $\beta$, it is therefore possible for the light reflected at the side wall 12 to be deflected in any desired direction. In the embodiment illustrated in FIG. 1, by way of example, the angles have been chosen to be $\alpha=45°$, $\beta=90°$, so that the light is deflected through 90° by comparison with the light-conducting fiber inserted into the fiber guide trench, provided there is no liquid in the section 102. By suitably selecting the respective aforementioned predetermined angles, any desired variation of deflection angles is possible.

Also provided in the optical component 1 according to the invention are means for displacing the liquid from the first section 101 into the second section 102. If the liquid, which has a refractive index that differs considerably from that of the air located hitherto in the section 102, is introduced into the section 102, so that the light beam is deflected by the liquid onto the side wall 12 within the section 102, the behavior at the interface changes because of the different refractive indices of air and the liquid.

According to the invention, in the first embodiment according to the invention, the material forming the plastic plate 1 and the liquid are selected in such a way that they have an essentially identical refractive index.

In this case of the essentially identical refractive indices of liquid and plastic plate, light passing through the liquid in the section 102 therefore passes undeflected through the interface and does not change its direction, as illustrated in FIG. 1b.

By optionally introducing the liquid into the area of the light beam in the section 102 of the cavity 10, and removing the liquid, it is therefore possible for the light to be switched between any desired, predetermined directions, given suitable formation of the geometry of the interface, the side wall and the guide trench.

In this case, the means considered for varying the position of the liquid within the cavity 10 is, in particular, known piezoelectrically driven actuators 14. Particular advantages of the fluidic control of light beams in miniaturized optical components arise from their miniaturized construction, since then the quantity of liquid to be moved can naturally be kept very small. In addition, high switching frequencies are also advantageously possible in the case of the actuators that are available in micro-fluidics. The abovementioned cavities 10, 101, 102 can be constructed in miniaturized forms as channels by means of microtechnical methods, and therefore the optical component 1 according to the invention can be produced very cost-effectively in large numbers.

Second Embodiment

FIG. 2 shows the optical component 2 with a controllable Fresnel lens arrangement 2 as a second embodiment of the present invention, in longitudinal section. The elongate cavity 20 within the optical component 2 (formed of plastic) is essentially bounded by the two opposite, essentially parallel, side walls 21 and 22. According to the invention, a Fresnel lens structure is formed in the side wall 22 of the cavity 20 in the section 202. One end of the elongate cavity 20 opens in a cavity 201 whose longitudinal section is enlarged and which serves as a reservoir for a liquid with a suitable refractive index. At its other end, the cavity 201 is sealed off by a means 14 for conveying the liquid from the section 201 into the section 202 of the cavity 20, said means being constructed so as to convey liquid F from the section 201 into the section 202 and to convey the liquid out of the section 202 again and back into the section 201. The conveying means is advantageously a piezoelectric actuator 24.

In this case, according to the invention the cavity 202, cavity 201 and piezoelectric actuator 24 are dimensioned in such a way that the liquid F, together with the corresponding design of the two cavities 202 and 201, functions as a fluidic directional amplifier for the piezoelectric actuator.

According to the invention, suitable material selection of the plastic body of the component 2 and of the liquid F means that the plastic body 2 and the liquid F have essentially the same refractive index. If, then, the liquid F is introduced into the section 202 of the cavity 20, as illustrated in FIG. 2b, the Fresnel lens structure no longer exists and the light passes through the entire arrangement as though it were a thick homogeneous plate.

Figure 2A:
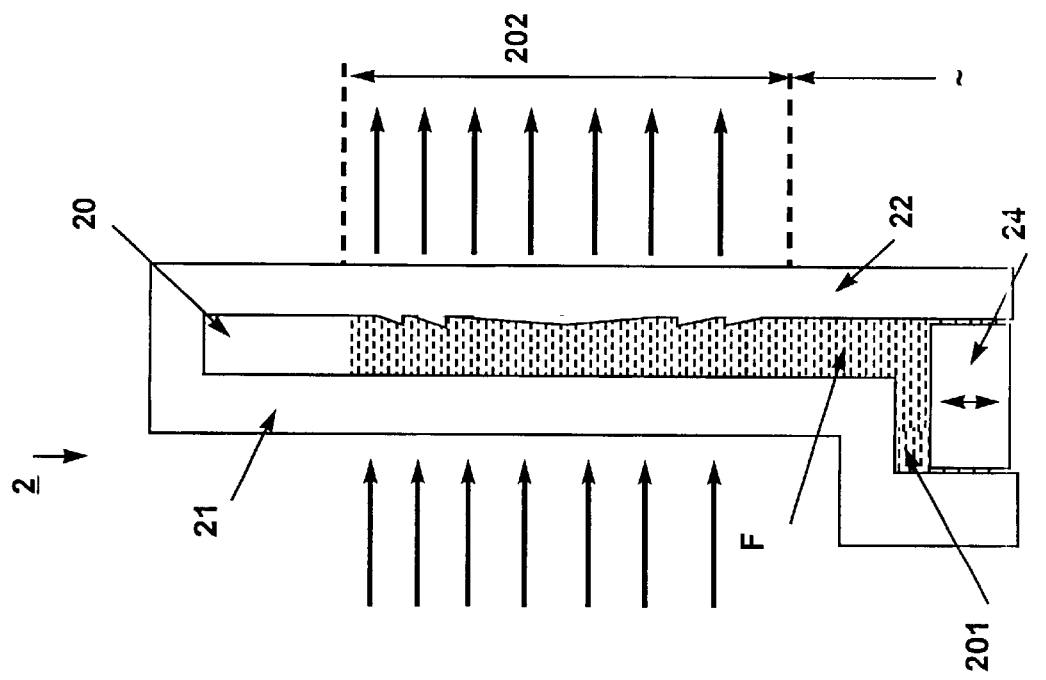
FIGS. 2a) and b) show a second embodiment of the present invention.
Figure 2B:
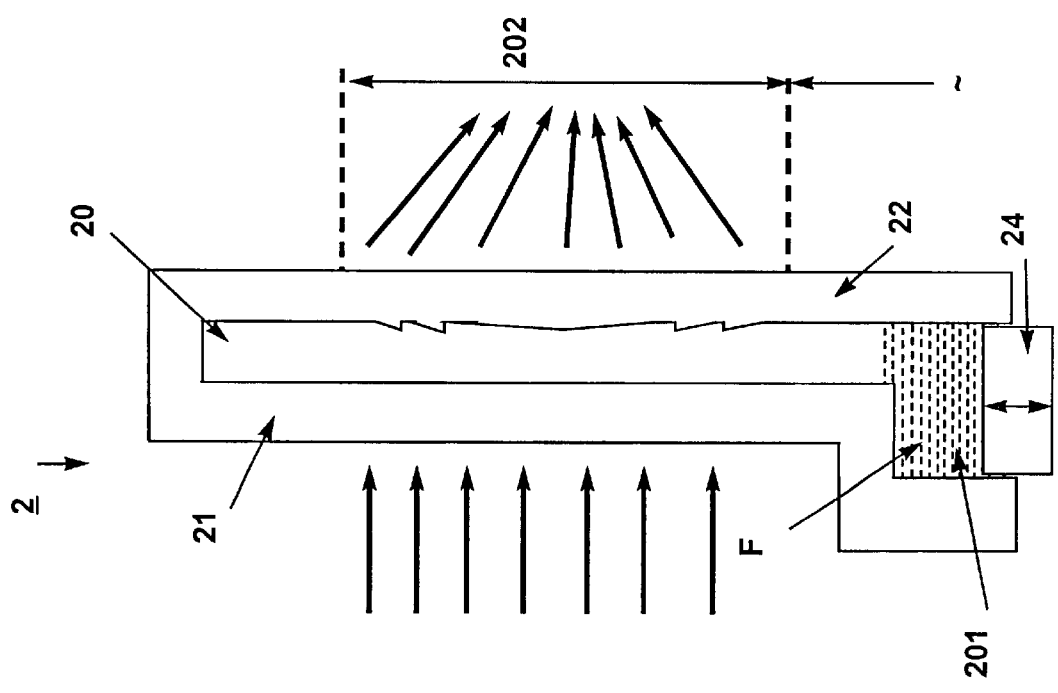

When the liquid F is removed from the area 202, as illustrated in FIG. 2a), the light is modulated by the lens in the side wall 22. It is clear that the second embodiment of the present invention can also be switched at high frequency between the two circuit arrangements of FIGS. 2a and 2b.

Third Embodiment

Figures 3A, 3B:
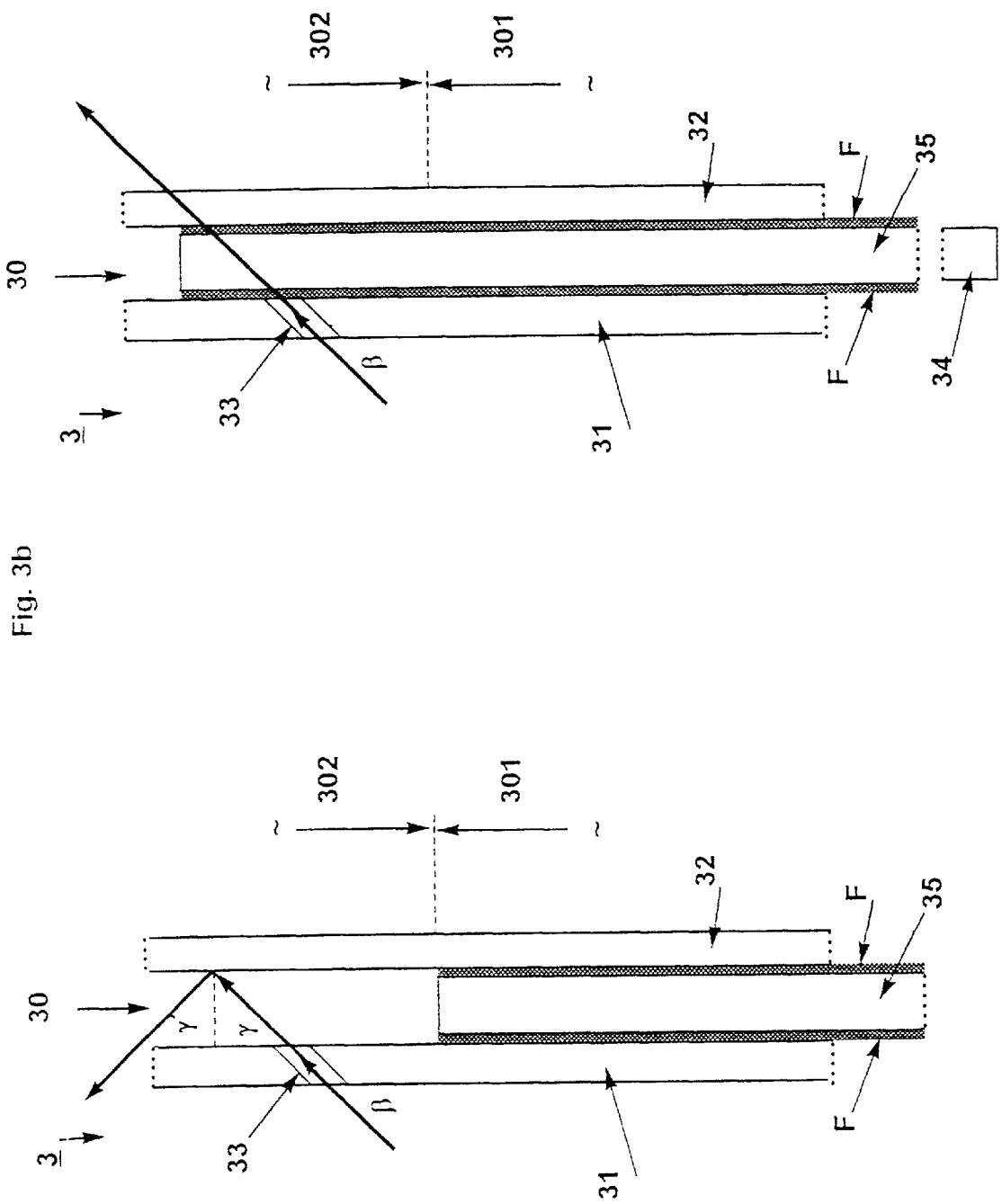
FIGS. 3a) and b) show a third embodiment of the present invention.

FIGS. 3a and b show the third embodiment of the present invention, which is a modification of the first embodiment.

The third embodiment of the optical component 3 according to the invention comprises the plastic body 3 with the cavity 30, which is essentially formed by the two opposite side walls 31 and 32. According to the invention, here the two side walls 31 and 32 are arranged in parallel, so that the cavity 30 is elongate. A fiber guide trench 33 is let into the first side wall 31 here at an angle β of 45° and determines the direction of a light-conducting fiber, as in the first embodiment.

The cavity 30 comprises a first section 301, in which a plastic rod 35 of the same material as the plastic body 3 is arranged. The plastic rod 35 is matched in terms of its dimensions to the cavity 30 in such a way that it can be displaced within the cavity 30, and fills the section 301 of the cavity as far as possible.

According to the invention, a liquid film F is introduced between the inner sides of the side walls 31 and 32, its refractive index being essentially identical to the refractive index of the selected material of the plastic body 3. If, then, the plastic rod 35 with the liquid film F is introduced from the first section 301 into the second section 302, the light beam that is incident on the side wall at an angle γ is no longer reflected at the angle γ at the side wall 32, as in FIG. 3a, but passes through the liquid film F, the plastic rod 34 and the side wall 32 like a thick homogeneous plate. As in the first and second embodiments, the drive means used for the plastic rod 35 are, for example, piezoelectric actuators 34, so that the third embodiment can also be switched at high frequency.

As compared with the first embodiment of the present invention, it is clear that in the case of the third embodiment, the central plastic rod 35 can also be replaced by liquid, and then the third embodiment constitutes a modification of the first embodiment with changed angular relationships. In addition, it is clear that here, too, the relative angular position of the fiber guide trench 33 and of the two side walls 31 and 32 can be varied in many ways.

Fourth Embodiment

FIGS. 4a and b show a fourth embodiment of the present invention with the optical component 4 comprising the plastic body 4, in which the cavity 40 with a first section 401 and a second section 402 is formed. The first section 401 serves as a reservoir for a liquid F which, by means of piezoelectric actuators 44, for example, can be conveyed from the first section 401 into the second section 402, and can be removed again from the second section 402.

The cavity 40 essentially comprises the two opposite side walls 41 and 42, a beam deflection device 46 being arranged at one end of the side walls and, opposite the beam deflection device, a fiber guide trench 43 being let into the section 401 of the cavity, parallel to the side walls 41 and 42. The beam deflection device 46 is provided with extensions 411 and 412 of the side walls which are angled over with respect to the two side walls 41 and 42, in each case at different angles. In the fourth embodiment of the present invention, the liquid F is selected such that it has a refractive index which is suitable to deflect the light beam onto the extension 411 or onto the extension 422, depending on the position of the liquid F in the cavity 40.

FIG. 4a shows the liquid in the section 401. Here, the light beam passes through the liquid F in the section 401, is deflected slightly by said liquid in accordance with its refractive index and then passes through the air in the section 402 and is deflected by the extension 411 of the beam deflection device 46.

FIG. 4b shows the liquid F, which now, by means of piezoelectric actuators, for example, not only fills the section 401 but also fills the section 402, wholly or partially, from a liquid reservoir, which can be designed as a path amplification means as in the third embodiment. The light led in by the light-conducting fiber laid in the fiber guide trench 33 now passes through the liquid F through a correspondingly longer path and is accordingly deflected further; for which reason the light is now deflected in a second direction by the extension 422 of the beam deflection device 46. By suitably selecting the materials for the plastic and the liquid F, and the geometry of the cavity and of the beam deflection device, it is possible for any desired angular deflections to be switched, even at high frequency, as in embodiments 1 to 3.

According to the invention, the cavities 10, 20, 30 and 40 can be formed in miniaturized form as narrow channels, it being possible for the distances between the side walls 11, 12; 21, 22; 31, 32; 41, 42 to lie in the range around 100 $\mu$m.

The material for the plastic body can be selected, for example, from PE, PP, PS, PC and PMMA.

FIGS. 1 to 4 in each case show longitudinal sections of those parts of the optical components 1, 2, 3 and 4 which are essential to the invention, and it is clear that the plastic bodies of the components have a base plate and covering which are not shown. The height, likewise not shown, is of the order of magnitude of the distance between the respective side walls, so that the cavities 10, 20, 30, 40 in each case can have a rectangular or square cross section.

The geometry shown in each case in the exemplary embodiments 1–4 is exemplary and can be modified as desired. The basic idea of the present invention is the use of liquids with a suitable refractive index in optical components for controlling light beams.

According to the invention, the liquid F is introduced into the optical components 1, 2, 3, 4 during manufacture and is arranged such that it can be displaced in terms of its position within the components, by which means light beams can be controlled. The liquid F is therefore a constituent part of the component.

At the same time, means are provided for changing the position of the liquid in channel-like cavities, so that the light can optionally be led through the liquid. By suitably selecting the refractive index of the liquid as a ratio of the refractive index of the plastic of the component, it is possible, for example, to form the aforementioned exemplary embodiments 1–4.

In addition, it is clear that, in addition to the refractive index, the surface tension of the liquid and capillary effects in the cavities are taken into account when selecting the material of the liquid and plastic of the optical component.

The invention is in no way restricted to the above exemplary embodiments and can be modified in many and various ways by those skilled in the art.

Particular advantages are achieved by the present invention in that it is made possible in a simple way to deflect light beams in miniaturized optical components through an unlimited angular range. The actuators which are available in micro-fluidics also permit high switching frequencies to be achieved, and the fluidic channels/cavities can be produced very cost-effectively by microtechnical processes, and can be produced in large numbers.

In the following text, advantageous embodiments five to seven of the present invention will be described in detail. The embodiments one to seven are based on the common inventive idea of providing an optical waveguide with one light input and at least two light outputs in a basic body. In this case, the basic body according to the invention is structured in such a way that light incident through the light input is led along a first path to a first light output or is led along a second path to a second light output, and can also be switched at high frequency between the two light paths. This is achieved by the first and second light paths being separated by at least one suitably designed channel, which connects together in the basic body two suitably formed cavities.

The light paths have a predetermined, defined refractive index in each case. The basic body can, as for example in embodiments 5 and 6, consist of a material which essentially has the same refractive index, which is essentially identical to the refractive index of the light paths, the light paths being formed by two opposite trenches in the basic body, and the basic body can consist, for example, of a suitable plastic, a suitable glass or of silicon.

The basic body can also consist of a material which has a refractive index which is considerably different from the refractive index of the light paths (e.g. embodiment 7), and the light paths can be optically conductive fibers which are arranged in the basic body.

A medium with a suitable refractive index is introduced partially into the channel system comprising the channels and cavities, such that it can be displaced. The medium can be a suitable gas or advantageously a suitable liquid. At at least one of the cavities, a means for displacing the medium within the channels is provided, so that the medium is optionally arranged within the first or second light path. The cavities advantageously have a cross section which is large by comparison with the cross section of the channels, and advantageously have a volume which is large by comparison with the volume of the channels.

The means considered for displacing the medium are advantageously piezoelectric actuators, which can also be switched at high frequencies. For example, piezoelectric actuators which achieve flexures of 1–2 $\mu$m at voltages of 12V can be obtained on the market.

Given an actuator diameter of 8 $\mu$m, in a liquid channel of, for example, 50 $\mu$m*50 $\mu$m, displacements of a liquid front of 20 mm are therefore possible.

According to the invention, the optical component of the present invention, which may be an optical switch, is manufactured using microtechnical methods which are suitable for providing structures with a cross section of the order of magnitude of 10 $\mu$m×10 $\mu$m up to 100 $\mu$m×100 $\mu$m.

The component/the optical switch according to the invention is therefore advantageously formed in an essentially two-dimensional structure.

According to the invention, however, instead of the piezoelectric actuators, thermal actuators with a thermoplastic drive or memory-metal drives can be arranged in the following embodiments five to seven and also in the previous embodiments 1 to 4.

It is clear that it is also possible for a number of such arrangements to be arranged in a basic body.

It is also clear that a number of light outputs and therefore more than two light paths can also be provided in the basic body, said light paths being interrupted by suitable channel systems with liquids, so that it is possible to switch between the light paths.

Fifth Embodiment

Figure 5A:
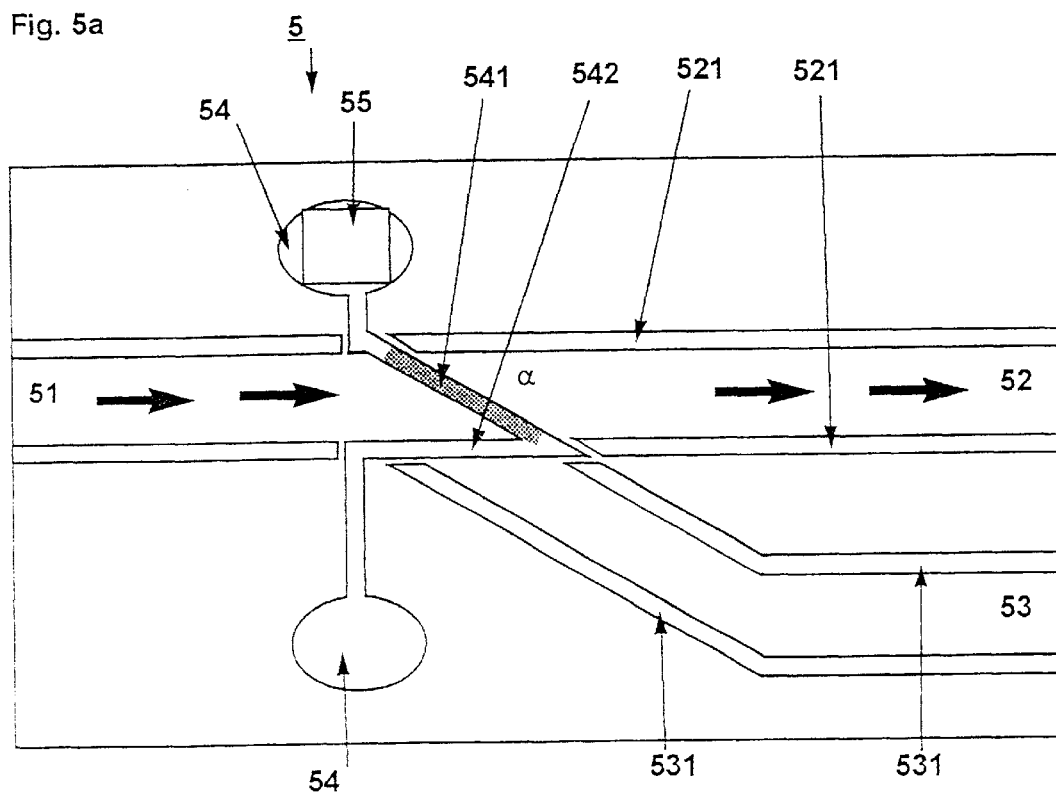
FIGS. 5a) and b) show a fifth embodiment of the present invention with two chambers and one channel.

FIGS. 5a) and b) show a longitudinal section through a fifth advantageous exemplary embodiment of the present invention. Formed in a basic body 5 of light-conducting material (for example selected from PE, PP, PS, PC and PMMA) are a first and second parallel trench 521 at a predetermined distance and with a predetermined width, in such a way that they extend essentially through the entire basic body 5. In FIG. 5, the two trenches 521 are formed as parallel straight lines, by way of example. If, then, light is introduced into the area between the two trenches 521 on one side of the basic body 5, the light is propagated in the basic body 51 in such a way that it is reflected at the trenches 521 and therefore remains in the interspace between the two trenches 521. The light therefore passes through the basic body in the direction of the arrow as illustrated in FIG. 5a, and emerges from the basic body 5 between the two trenches 521 at the point 52 which is opposite the light inlet 51. The interspace between the two trenches 521 therefore has the function of a light conductor 51–52.

According to the invention, a first cavity 54 is formed in the basic body 5 outside the light conductor 51–52, on one side of the light conductor 51–52, opposite the first trench 521, and a second cavity 54 is formed on the other side of the light conductor 51–52, opposite the second trench 521. In FIG. 5, the two cavities 54 are formed cylindrically by way of example. According to the invention, the first and second trenches 521 each have an interruption at a predetermined point, which lie opposite each other. In addition, according to the invention the first and second cavity 54 are connected to each other by means of a channel 541–542 with a predetermined width. The interruption to the first trench 521 is advantageously designed to be somewhat larger than the width of the channel 541–542, and the interruption to the second trench 521 is advantageously designed to be greater than the distance between the two trenches 521 and is arranged with its one end opposite the interruption to the first trench 521. According to the invention, the channel 541–542 leads in a first section from the first cavity 54 to the interruption to the first trench 521 and, in a second section 541, leads in a straight line through the light conductor 51–52 to the other end of the interruption to the second trench 521 and, in a third section 542, leads along the interruption of the second trench 521 in a line with the second trench 521 to the end of the interruption to the second trench 521, which is arranged opposite the interruption to the first trench 521 and, in a fourth section, leads to the second cavity 54. In this order, the first, second, third and fourth sections of the channel 541–542 form a connection between the two cavities 54. The second section 541 of the channel 541–542 is, according to the invention, arranged at a predetermined angle α in the range of 10°–80°, advantageously 30°–60°, to the parallel trenches 521. The size of the interruption to the second trench 521 is in this case selected so as to correspond to the angle α.

According to the invention, a third and fourth trench 531 with a predetermined width and at a predetermined spacing parallel to each other are formed in the basic body 5. The width and the spacing of the third and fourth trenches 531 advantageously correspond to the width and the spacing of the first and second trenches 521. The two trenches 531 are formed as parallel straight lines, for example, so that their interspace functions as a light conductor, like the interspace between the first and second trenches 521. According to the invention, the third trench 531 begins at the end of the interruption to the second trench 521 at which the section 541 of the channel 541–542 is arranged, and the fourth trench 531 begins at the other end of the interruption to the second trench 521. According to the invention, the third trench 531 is arranged in a line with the second section 541 of the channel 541–542. As FIG. 5 illustrates, the third and fourth trenches can be angled over during their further course, so that, for example, they lead out of the basic body 5 parallel to the first and second trenches 521.

The above structure of the basic body 5 is also covered by a thin plastic sheet, so that the cavities 54 and the channel 542–541 are sealed off in a gastight and liquid-tight manner. According to the invention, the two cavities 54 are filled with air, while in the second section 541 of the channel 541–542 there is arranged a liquid with essentially the same refractive index as the light-conducting basic body 5. The above trenches 521 and 531 can be formed so as to pass through the basic body 5, the basic body 5 being provided with a base plate, which seals off the cavities 54 and the channel 541–542 in an airtight manner.

Figure 5B:
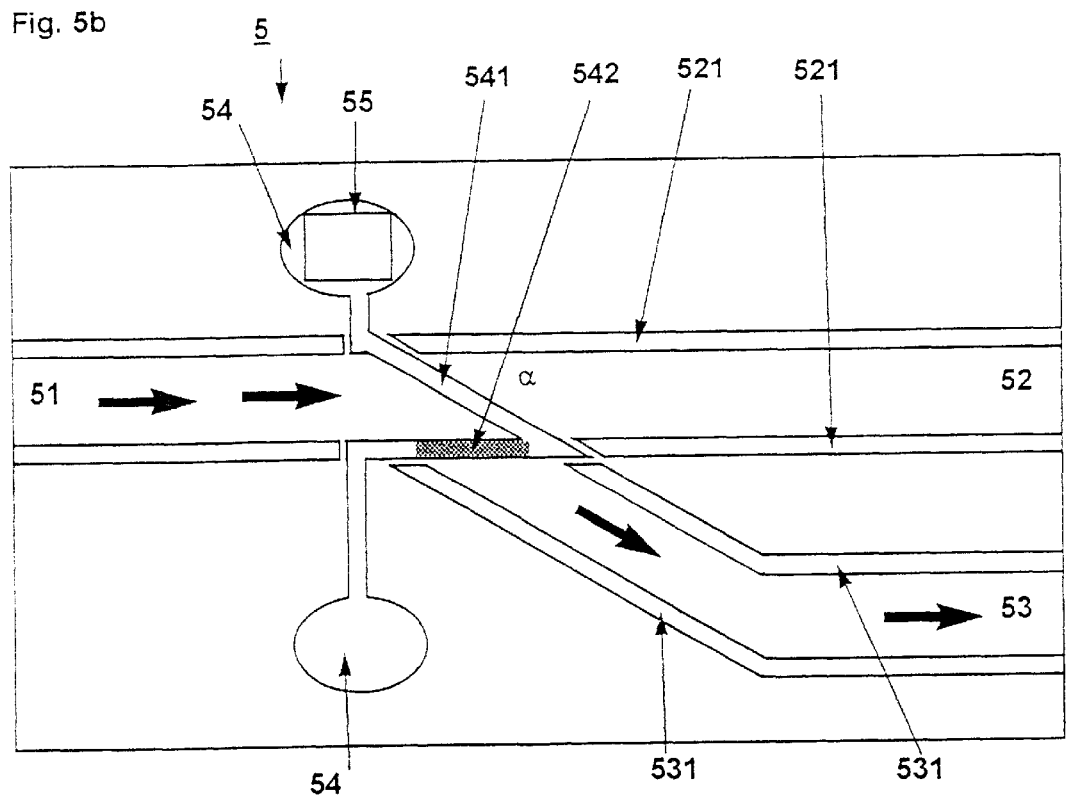

According to the invention, in the fifth embodiment of the present invention, a means 55 for displacing the liquid in the channel 541–542 is additionally arranged above one of the two cavities 54, and is suitably a piezoelectric actuator 55. The operating state in which there is no voltage present on the piezoelectric actuator 55 is illustrated in FIG. 5a. If light is introduced into the basic body 5 in this operating state, into the interspace 51 between the two trenches 521, the light passes through the basic body through the optical waveguide 51–52 which is bounded by the two trenches 521 and the third section 542 of the channel 541–542, in which there is air in this state. If a voltage is then applied to the piezoelectric actuator 55, then the piezoelectric actuator 55 exerts a pressure on the gas volume (air here) enclosed in the cavity 54, this pressure is propagated in the channel 541–542 and displaces the liquid from the second section 541 into the third section 542 of the channel. In this operating state, therefore, the second section 541 of the channel 541–542 is filled with a gas which has a significantly different refractive index than the light-conducting basic body 5, and the liquid with the refractive index that is essentially identical to that of the basic body is arranged in the third section 542 of the channel 541–542. Therefore, in this operating state, which is illustrated in FIG. 5b, light which is introduced into the basic body 5 in the light inlet 51 between the two trenches 521 is reflected at the second section 541 of the channel 541–542, passes through the third section 542 of the channel and, in its further course, the light is propagated between the two trenches 531 and emerges from the basic body 5 at the output 53.

In a modification of the fifth embodiment of the present invention, the first and second cavities 54 are covered by a first and second piezoelectric actuator 55, and the two cavities 54 are filled with a liquid with a suitable refractive index. In this modification, voltage is applied alternately to the two actuators 55, so that the liquid is forced into the first and second sections 541 of the channel 541–542 alternately on the one side by means of the first piezoelectric actuator 55, while the third section 542 of the channel 541–542 is filled with gas, since the second actuator 55 is in the rest state, and on the other side, by means of the second piezoelectric actuator 55, the liquid is forced from the second cavity 54 into the fourth and third sections 542 of the channel, while the first actuator 55 is in the rest state and the second section 541 of the channel 541–542 is filled with gas.

By means of the above fifth embodiment of the present invention, an optical switch according to the invention is provided.

Sixth Embodiment

Figure 6A:
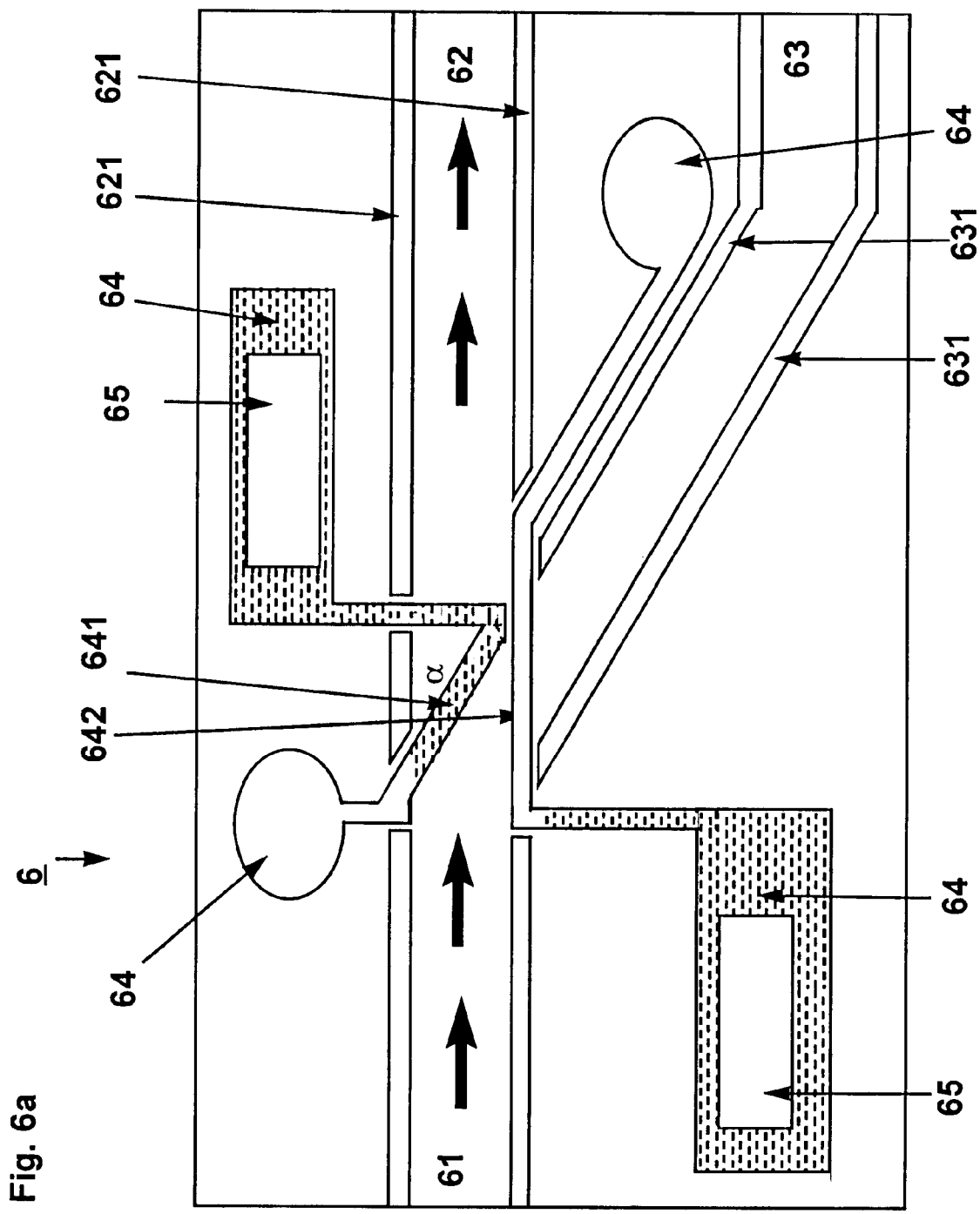
FIGS. 6a) and b) show a sixth embodiment of the present invention with four chambers and two channels.

FIGS. 6a and b show a sixth embodiment of the present invention, which is a further modification of the above fifth embodiment. Formed in the light-conducting basic body 6 are a first and second trench 621 and a third and fourth trench 631, in each case corresponding to the first and second trench 521 and the third and fourth trench 531 of the fifth embodiment. Differing from the fifth embodiment, however, the first trench 621 has a first and second interruption, which in each case lie opposite the two ends of an interruption to the second trench 621, which corresponds to the interruption to the second trench 521 of the fifth embodiment. The interspace between the first and second trenches 621 forms an optical waveguide 61–62, and the interspace between the third and fourth trenches 631 forms an optical waveguide 61–63. In addition, a first and second cavity 64 are formed in the basic body 6 on one side of the optical waveguide 61–62, and a third and fourth cavity 64' are formed on the other side of the optical waveguide 61–62, of which cavities one is arranged between the first 61–62 and second 61–63 optical waveguides.

According to the invention, the first and second cavities 64 are connected to a first channel which has three sections. The first section of the first channel extends from the first cavity 64 to the first interruption to the first trench 621. The second section 641 of the first channel extends through the optical waveguide 61–62 at an angle α to the trenches 621, following the first section. The angle α corresponds to the angle α of the fifth embodiment of the present invention, and the second section 641 of the first channel corresponds in terms of its position and form to the second section 541 of the fifth embodiment. The third section of the first channel, following the second section 641, extends vertically through the optical waveguide 61–62, through the second interruption to the first trench 621 as far as the second cavity 64, so that the two cavities 64 are connected to each other by means of the first channel. In this case, the first and second interruptions to the first trench 621 are designed to be slightly larger than the width of the first channel. According to the invention, the third and fourth cavities 64' are connected to each other via a second channel, which essentially has three sections like the first channel. The first section of the second channel extends from the third cavity 64' to the end of the interruption to the second trench 621 which is located opposite the first interruption to the first trench 621. The second section 642 of the second channel, following the first section, extends along the interruption to the second trench 621, and corresponds in terms of its position and form to the third section 542 of the fifth embodiment. The third section of the second channel follows the second section 642 and extends as far as the fourth cavity 64'. In this way, the third and fourth cavities 64' are connected to each other by means of the second channel.

The basic body 6 structured as described above is sealed off at the bottom, just like the basic body 5, by the cavities, trenches and channels not being designed to be continuous or by the basic body 6 being provided with a base plate. In addition, the basic body 6 is closed in a gastight and liquid-tight manner by a thin plastic covering sheet, and a liquid with a refractive index that is essentially the same as that of the basic body 6 is introduced into a cavity in the first and second cavities 64, the liquid suitably filling the cavity 64 completely, while a gas, such as air, is contained in the other cavity 64.

In addition, a liquid having essentially the same refractive index as the basic body 6 is likewise introduced into a cavity in the third and fourth cavities 64', so that the liquid suitably fills the cavity 64' completely, while a gas, such as air, is likewise contained in the other cavity 64'.

Arranged on the cavities 64 and 64' filled with the liquid is, in each case, a means 65 for displacing the liquid from the cavity 64 and 64' into the respective channel sections 641 and 642. The means for displacing the liquid are preferably piezoelectric actuators 65, which are advantageously arranged above the cavities 64 and 64'.

The cavities 64 and 64' can for example be cylindrical, cuboidal, box-like or elliptical, their dimensions being given by the dimensions (width, height and length) of the respective channels, the volume of liquid to be transported which results from this, and the actuators 65 used. According to the invention, the cross section and the volume of the cavities are large by comparison with the cross section and the volume of the channels. This also applies to the other embodiments of the present invention.

Figure 6B:
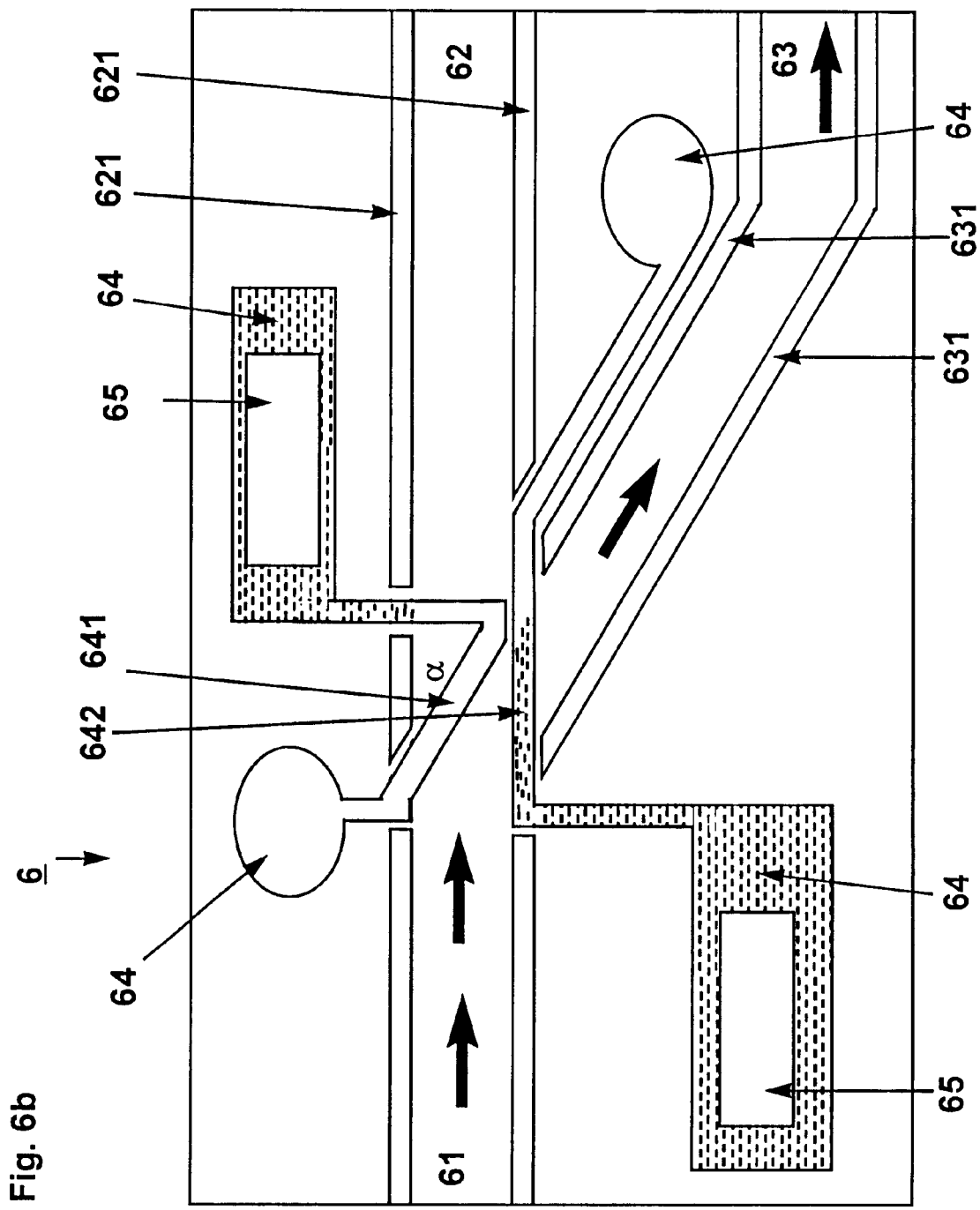

FIGS. 6a and 6b show the two operating states of the sixth embodiment of the present invention, which functions as an optical switch.

In the first operating state of FIG. 6a, a voltage is present on the actuator 65, so that the liquid contained here in the second cavity 64 also fills the second 641 and third sections of the first channel. The first cavity 64, filled with air, works as a buffer in this case. In addition, the actuator 65' is in the rest position, so that the second section 642 of the second channel is free of liquid. If, in this operating state, light enters the basic body 6 through the input 61, then it emerges from the basic body 6 again at the output 62.

In the second operating state of FIG. 6b, a voltage is present on the actuator 65', so that the liquid contained here in the third cavity 64' also fills the second 642 section of the second channel. The fourth cavity 64, filled with air, acts as a buffer in this case. In addition, the actuator 65 is in the rest position, so that the second section 641 and the third section of the first channel are free of liquid. If, in this operating state, light enters the basic body 6 through the input 61, then it emerges from the basic body 6 again at the output 63.

Seventh Embodiment

FIGS. 7a to e show a seventh advantageous embodiment of the present invention. Arranged in a basic body 70 are an input optical waveguide 71, preferably a polymer optical waveguide, and a first 74 and second 74' cavity on opposite sides of the input optical waveguide 71. Also formed in the basic body 70 is a channel 731–732, which connects the two cavities 74 and 74' to each other. The input optical waveguide 71 forks into two branches, namely a first 72 and second 73 optical waveguide. In this case, the first optical waveguide 72 can be formed as an essentially rectilinear extension of the input optical waveguide 71, and the second optical waveguide 73 can assume an arcuately curved course with respect to the optical waveguide 71. However, it is also possible for the two optical waveguides 72 and 73 each to deviate in opposite directions from the direction of the optical waveguide 71 at the branch. The essential factor for the present invention is that the two optical waveguides 72 and 73 lead to different positions in their further course. The radius of curvature R of an arcuately routed optical waveguide depends on the refractive index of the optical waveguide and the refractive index of the medium surrounding the optical waveguide. According to the invention, the first section 731 of the channel 731–732 leads from the first cavity 74 along the optical waveguide 71 and along the optical waveguide 72 on their one side, through the optical waveguide 73 as far as the area of the basic body 70 between the two optical waveguides 72 and 73. At the same time, in its section 731, the channel provides a gap between the optical waveguide 73 and the optical waveguide 71. The second section 732 follows the first section 731 of the channel 731–732 and, according to the invention, leads along the optical waveguide 73 and along the optical waveguide 71, on their one side (the other side of the optical waveguide 71) to the second cavity 74'. At the same time, in its section 731, the channel provides a gap between the optical waveguide 72 and the optical waveguide 71, according to the invention. Since the sections 731 and 732 are routed directly on one side of the optical waveguides 71 and 72 and on the other side of the optical waveguides 71 and 73, in the case of arcuate branches of the optical waveguides 72 and 73, are likewise of arcuate design and, at the point of the branch, have an essentially identical radius of curvature R to that of the optical waveguides 72 and 73.

The cavities 74 and 74' and the channel 731–732 do not penetrate the basic body 70 completely, so that they are sealed off at the bottom. The basic body 70 is covered by a plastic sheet 701, which suitably also covers the optical waveguides 71, 72 and 73 and seals off the cavities 74 and 74' in a gastight and liquid-tight manner. Contained in the two cavities 74 and 74' is a gas, for example air, and introduced in the first section 731 is a liquid having essentially the same refractive index as the refractive index of the optical waveguides 71, 72 and 73. Arranged on one of the two cavities 74 and 74' is a means 75 for reducing the volume of the cavity 74 and therefore for exerting a pressure on the gas in the cavity 74. The means 75 is advantageously a piezoelectric actuator 75.

Figure 7A:
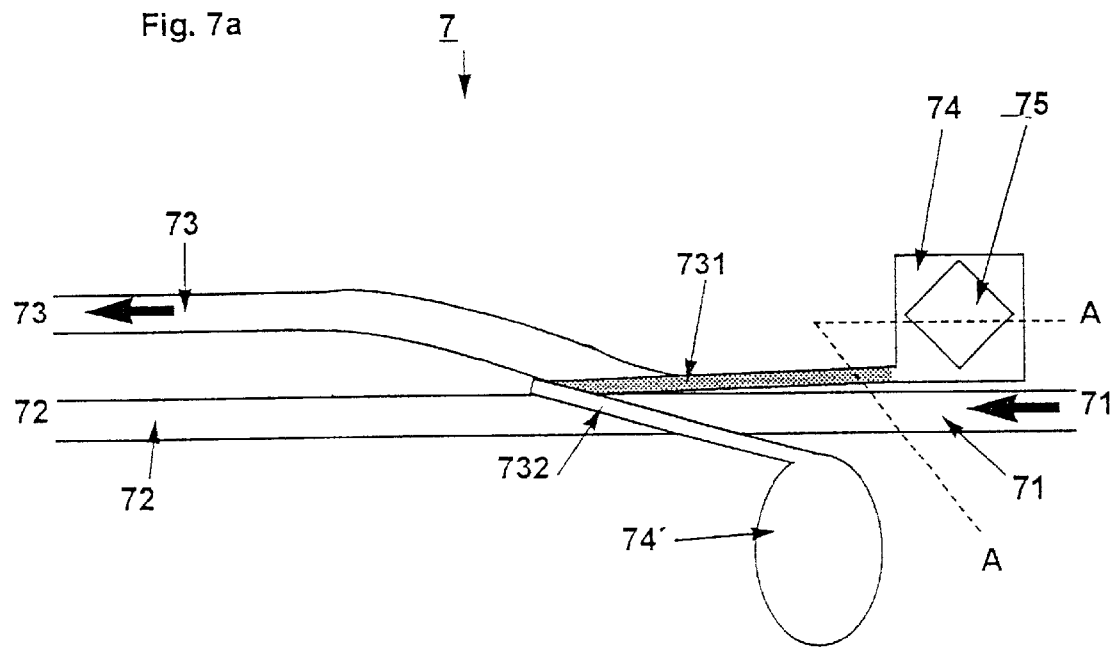
FIGS. 7a) and b) show a seventh embodiment of the present invention with a branching optical waveguide and two chambers and one channel.

FIG. 7a shows the first operating state of the above-described arrangement according to the invention, which provides an optical switch, there being no voltage on the piezoelectric actuator 75, and therefore no pressure being exerted on the gas in the cavity 74, and the liquid being arranged in the section 731 of the channel. In this operating state, light from the waveguide 71 is deflected into the waveguide 73. The first operating state is likewise illustrated in FIG. 7c, a section along the line A—A in FIG. 7a.

Figure 7B:
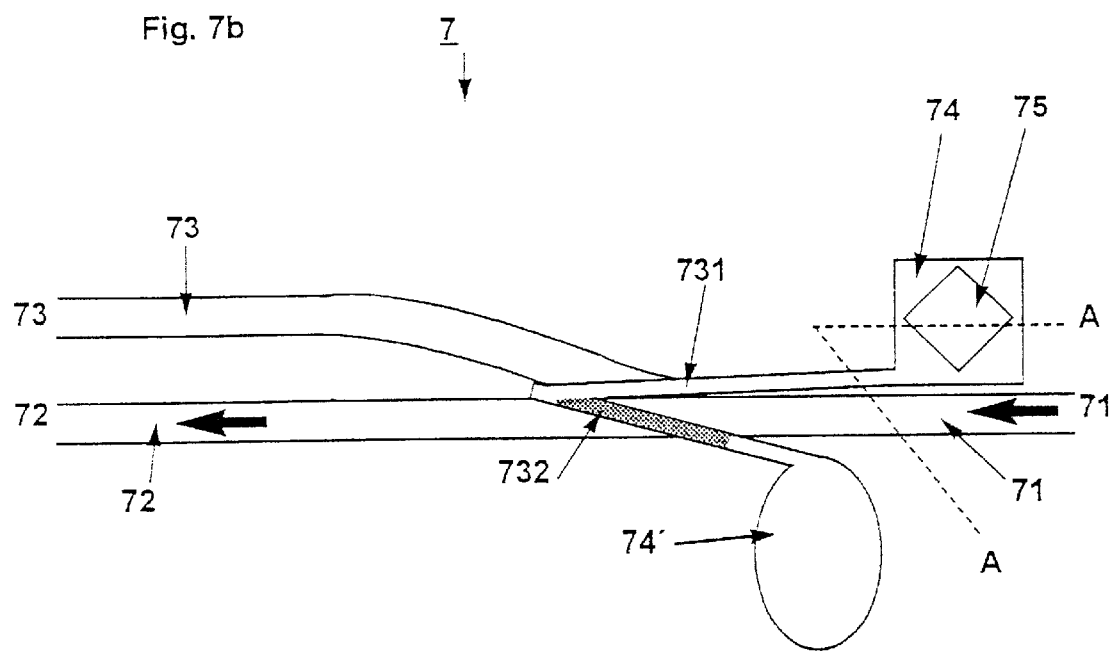
FIGS. 7c) and d) show a section along the line A—A in FIGS. a) and b)
FIG. 7e) shows a modification of the seventh embodiment of the present invention with three chambers.
Figure 7C:
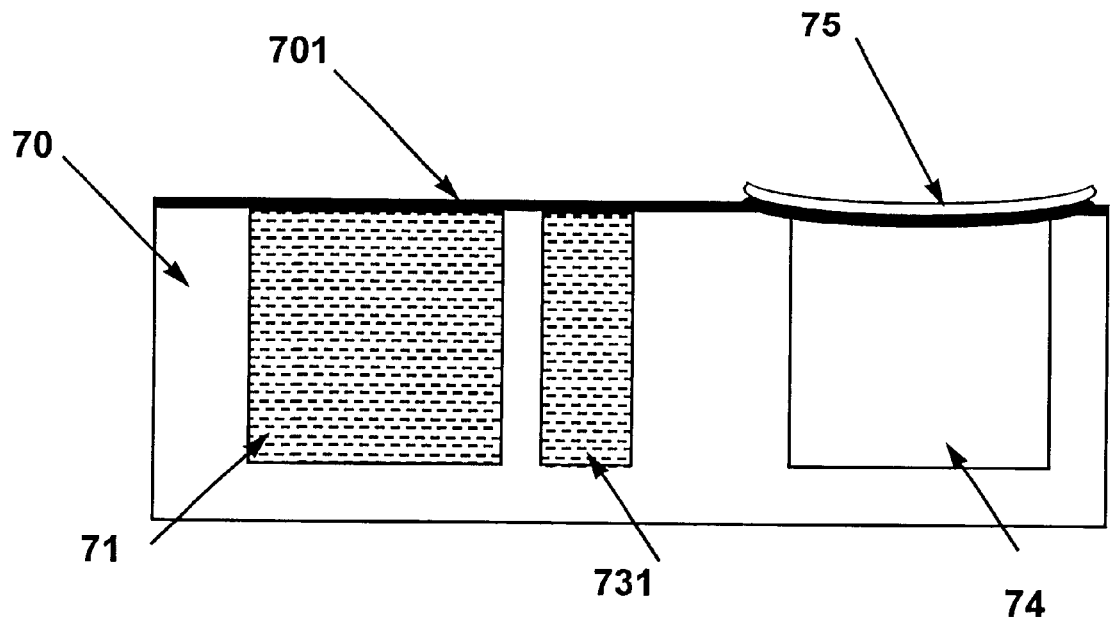
Figure 7D:
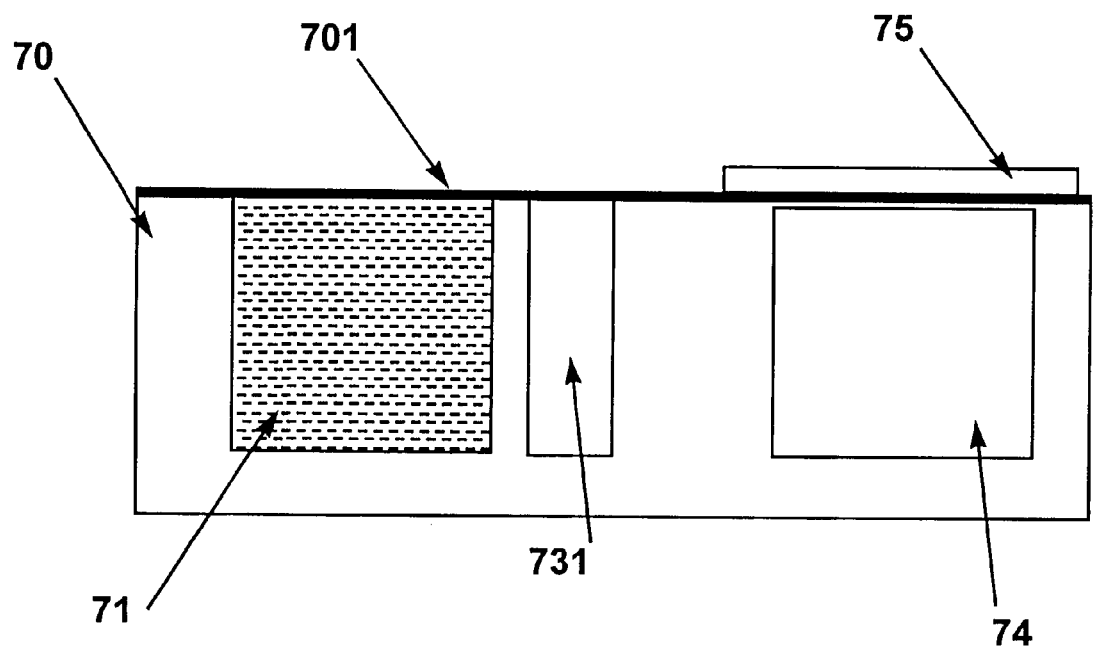

FIG. 7b shows the second operating state of the above-described arrangement according to the invention, which provides an optical switch, a voltage being present on the piezoelectric actuator 75, and therefore a pressure being exerted on the gas in the cavity 74 and, as a result, the liquid now being arranged in the section 732 of the channel. In this operating state, light from the waveguide 71 is deflected into the waveguide 72. If the voltage present on the actuator 75 is switched off, the device is transferred into its first operating state again. During the displacement of the liquid within the channel 731–732, the second cavity, likewise filled with gas, acts as a buffer, according to the invention. The second operating state is likewise illustrated in FIG. 7d, a section along the line A—A in FIG. 7b.

Figure 7E:
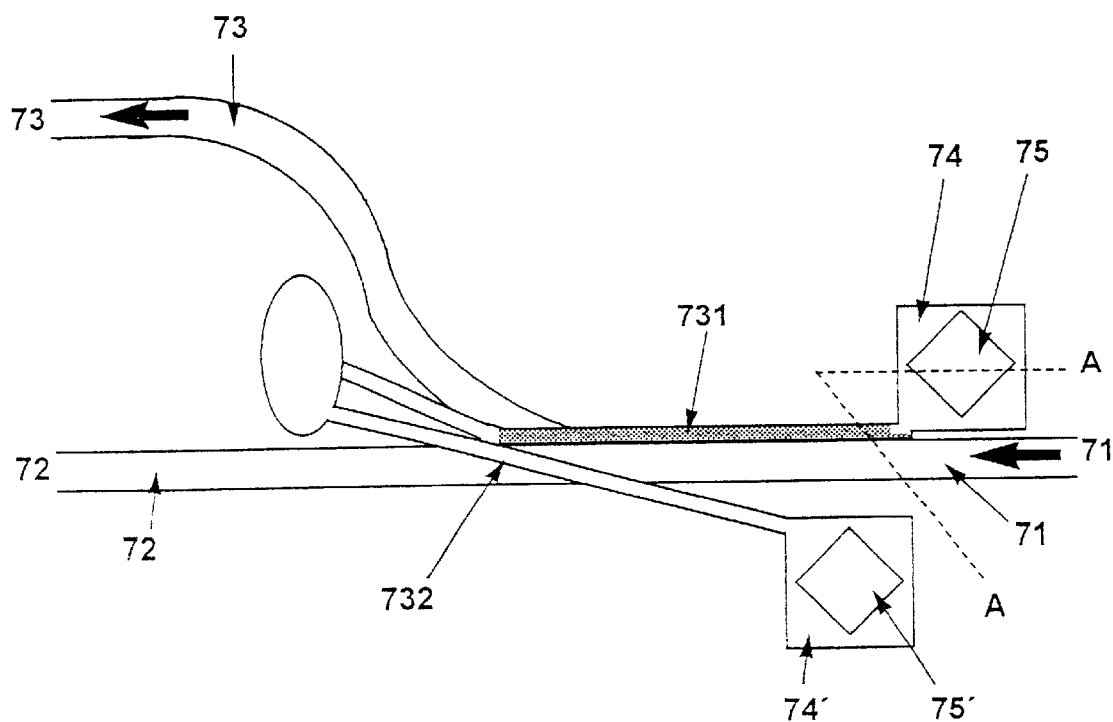

FIG. 7e shows a modification of the seventh embodiment of the present invention, in which a third cavity 76 is formed in the area between the two optical waveguides 72 and 73, and the first and second sections 731 and 732 are connected to each other via the cavity 76. In addition, in the modification of FIG. 7e, the first and second cavities 74 and 74' are both completely filled with the liquid with a suitable refractive index, and on both cavities 74 and 74', a means 75 and 75' is provided to displace the liquid into the channel sections 731 and 732, said means suitably being a piezoelectric actuator. By means of the alternate switching of the piezoelectric actuators 75 and 75', according to the invention in each case liquid is displaced out of one of the cavities 74 and 74' into one of the channel sections 731 and 732, while at the same time liquid is fed back from the other of the two channel sections 731 and 732 into the other of the two cavities 74 and 74'.

By this means, the two above-described operating states of the seventh embodiment of the present invention are provided. Here, the third cavity 76 is used as a buffer during the displacement of the liquids and simplifies the matching of liquid volumes, the volumes of the cavities 74 and 74' and the volumes of the channel sections 732 and 731.

Particular advantages of the present invention are achieved, as already mentioned above in relation to embodiments 1 to 4, by it being made possible in a simple way to switch light between different light paths, even at high frequency. The actuators that are available in micro-fluidics permit high switching frequencies, and the fluidic channels/cavities can be produced very cost-effectively using microtechnical methods and can be produced in large numbers. In addition, for the material selection of a suitable liquid, it is merely its refractive index in relation to the refractive index of the light paths, and its surface tension, which are critical.

Eighth Embodiment

Figure 8A:
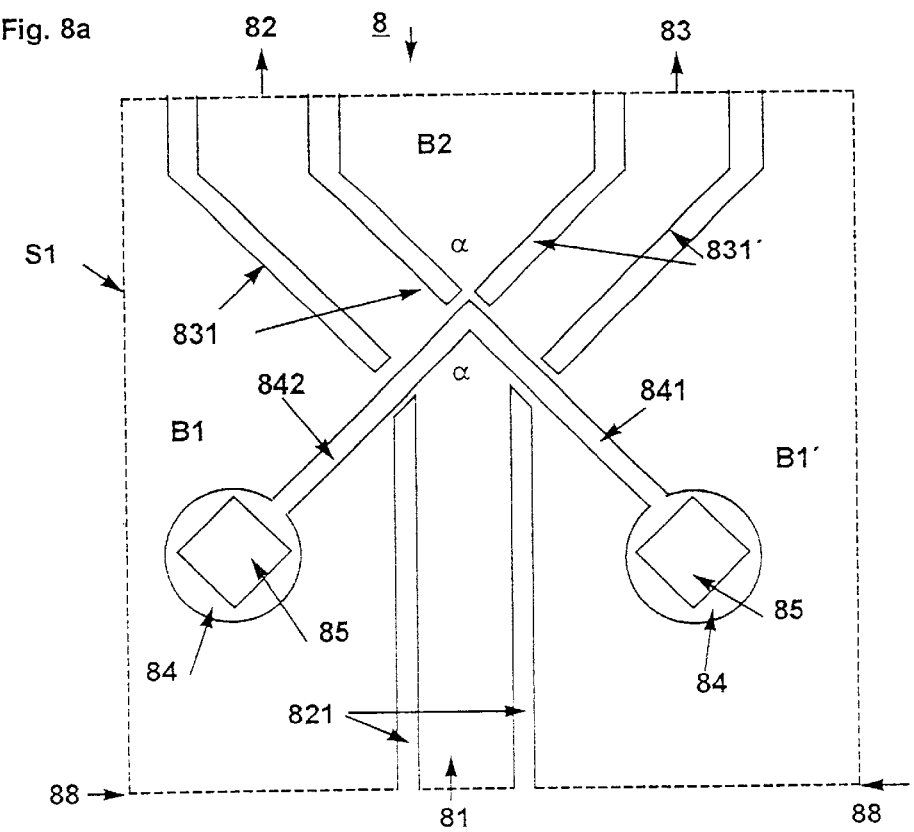
FIGS. 8a and b show an eighth embodiment of the present invention (a modification of the fifth, sixth and seventh embodiments of the invention)

FIGS. 8a and b show an eighth embodiment of the present invention, an advantageous modification of the fifth and seventh embodiments. Formed in a planar light-conducting substrate S1, as in the fifth embodiment, are essentially parallel trenches 821, 831 and 831' at essentially the same spacings, and they enclose an area which functions as a branching waveguide and is of Y-shaped design. The trenches 821 begin in a suitable way at an outer edge of the substrate S1, which is of rectangular design as an example in the drawing, and provide a light input 81 there. The ends of the two trenches 821 opposite the light input 81 are suitably arranged in the central area of the substrate S1. At the edge of the substrate which is opposite the light input 81, the parallel trenches 831 and 831' begin and provide two separate light outputs 82 and 83 there. In this case, the parallel trenches 831 and 831' are preferably arranged on the light outputs 81 and 82 in such a way that the light leaves the substrate S1 essentially parallel to the light input 81. In their subsequent further course, the two outer trenches 831 and 831' are aimed at the ends of one of the two trenches 821 in each case, and the ends of the two trenches 831 and 831' are advantageously arranged in the vicinity of the corresponding trench 821, so that a gap is formed between the trenches 831, 831' and 821, 821', said gap being somewhat wider than the width of a channel 841, 842, which will be described below. The two inner trenches 831 and 831' are aimed towards each other in their further course, and their two ends are arranged adjacently, so that a gap is formed between the two ends of the inner trenches 831 and 831', said gap being somewhat wider than the width of the channel 841, 842.

Figure 8B:
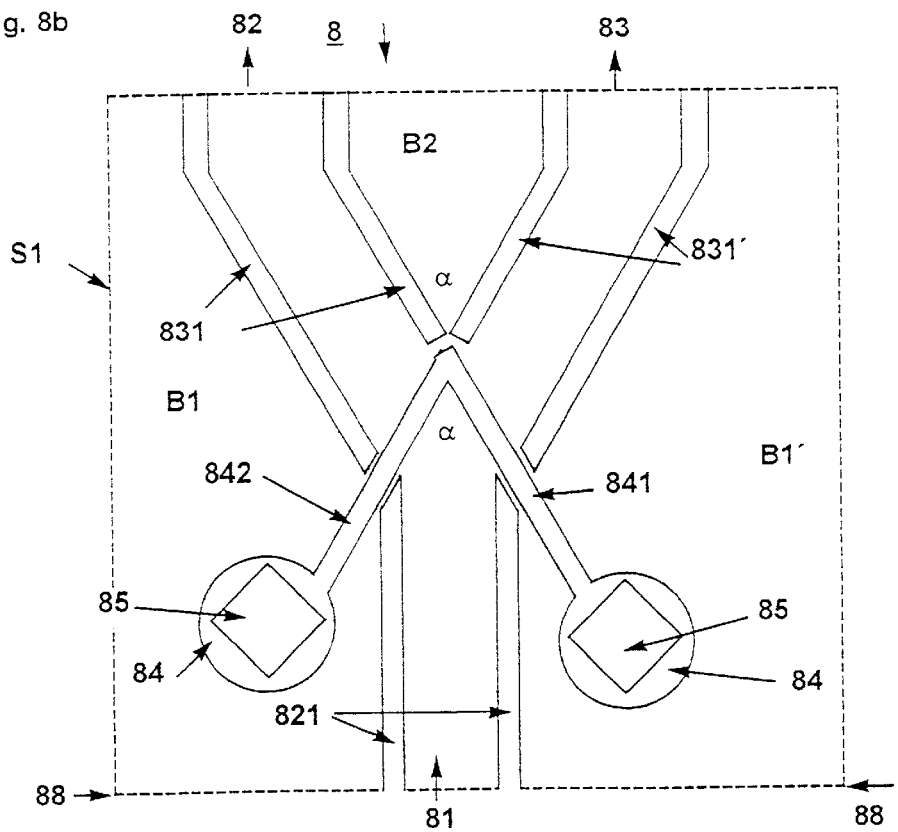

As described above, by means of the parallel trenches 821 and 831, 831', a waveguide with a light input 81, a Y-shaped fork and two light outputs 82 and 83 is provided in the substrate, said waveguide dividing the substrate into the areas B1 and B1' and B2. The areas B1 and B1' lie outside the fork, and the area B2 lies inside the fork. The parallel trenches 821 and 831 and 831' advantageously have essentially the same spacings, are essentially equally wide and are formed continuously through the substrate S1. In FIGS. 8a and 8b, the light path forks in a straight line at the angles α=90° and α=60°, by way of example, before the two light paths, angled over appropriately, are aimed at the two light outputs 82, 83, so that the light leaves the substrate S1 again essentially directed in the same direction as its light entry 81.

However, the two fork branches can also advantageously lead, by means of appropriately arcuately formed trenches 831 and 831', arcuately from the branch at the end of the two trenches 821 to the two light outputs. A branch which forms an angle <90° is advantageous, more advantageous <60°, even more advantageous <30°.

In addition, the two cavities 84 are formed in the substrate S1, opposite each other in the areas B1 and B1'. According to the invention, the two cavities are connected to a channel which, starting from the first cavity 84, leads in a first section 841 through the gap between the outer trenches 821 and 831' to the gap between the inner trenches 831 and 831' and from there, in a second section 842, leads through the gap between the outer trenches 831 and 821 to the second cavity 84. The first section 841 and the second section 842 therefore form at their point of contact an angle α whose magnitude, according to the invention, essentially corresponds to the magnitude of the angle α, so that the first and second sections 841 and 842 are in each case continuous extensions of the corresponding inner trenches 831 and 831'. The first and second sections 841 and 842 of the channel can therefore be formed linearly in relation to the corresponding trenches 831 and 831', as illustrated in FIG. 8a and FIG. 8b, or can also be of arcuate design (not illustrated).

According to the invention, therefore, a first and second light path 81, 82 and 81, 83 is provided in the substrate S1, with a common input 81 and various outputs 82 and 83, the exit of light from the substrate from the two outputs being essentially in the same direction as its entry. According to the invention, in addition the first light path 81, 82 is bounded in the fork area by the first section 841 of the channel, and the second section 842 leads through the core area of the first light path 81, 82; and the second light path 81, 83 is bounded in the fork area by the second section 842, and the first section of the channel 841 leads through the core area of the second light path 81, 83.

The channels are suitably formed continuously through the substrate S1. The cavities 84, 84 can also be formed continuously through the substrate S1, or can also penetrate the substrate only partially. According to the invention, the cavities have a cross section which is large by comparison with the cross section of the channel 841, 842, and enclose a volume which is large by comparison with the volume of the channel 841, 842.

According to the invention, as in the case of the fifth and seventh embodiments, a first liquid is introduced into the interconnected system of cavities 84, 84 and channels 841, 842, the refractive index of said liquid essentially corresponding to the refractive index of the optically waveguiding substrate S1, and, in addition, a second liquid and/or a gas is introduced which cannot be mixed with the first liquid and whose refractive index is considerably different from the refractive index of the optically waveguiding material. The base of the substrate S1 is provided with a base plate (not shown), and the substrate is covered at the top with a thin elastic sheet, which seals off the channel and the cavities 84, 84 in a liquid-tight and gastight manner. According to the invention, a microactuator 85 is optionally arranged above one or both cavities 84, 84 and, by changing the volume or pressure of a cavity 84, 84 or alternately changing the volume or pressure of both cavities 84, 84, introduces the first liquid optionally into the first 841 or second 842 section of the channel.

The microactuator 85 can cause the liquid to evaporate wholly or partially by thermal means and/or can advantageously be a micromechanical actuator, a piezoelectric actuator, a thermally moved diaphragm or a memory metal.

By means of the arrangement according to the invention of the micromechanical, advantageously piezoelectric, drive 85 above the cavities 84, and with the force effect perpendicular to the plane of the planar light propagation 81, 82 and 82, 83, and by means of the above-described dimensioning of the volumes of the cavities 84, the following advantages are achieved:

The particularly advantageous use of micromechanical, advantageously piezoelectric, actuators permits high-frequency switching as well, given miniaturized design of the light paths and of the channel, the liquid functioning, according to the invention, as a directional amplifier for the drive. The essentially one-piece design and the arrangement of the actuators 85 above the cavities permit cost-effective, particularly simple production in essentially only four operations, which can be carried out by using microstructuring methods, even in batch operation:

Step 1: Structuring the trenches and channels in the substrate S1.
Step 2: Providing the substrate with a base plate.
Step 3: Introducing the liquid F into optionally one or both sections of the system comprising channel 841, 842 and cavity 84, 84.
Step 2a: Sealing the substrate with a sheet.
Step 4: Arranging the actuators 85 on the sheet.
In the case of batch operation: Separating the individual switches from the substrate.

In addition, the drive according to the invention by means of piezoelectric actuators, as compared, for example, with thermal drives, advantageously permits a particularly wide selection of a suitable liquid F, merely in terms of its refractive index and its wetting properties.

By means of the above-described essentially one-piece design according to the invention of the switch 8, with essentially parallel light input 81 and light outputs 82 and 83, the fitting of the switch 8 to light conductors is assisted, even in existing systems, since the switching operation does not cause any disruptive change of direction, and there is only an offset in the plane of the light input.

The particularly advantageous feature here, as also in the case of the fifth and sixth embodiments, is the structuring of the trenches 821, 831, 831' and channels 841, 842 in one operation, the channels according to the invention being arranged as a continuous extension of the trenches 831 and 831' and, therefore, like the trenches 821, 831 and 831', functioning as boundaries of the light paths.

The switching operation of the eighth embodiment of the present invention is essentially identical with the switching operation of the fifth, sixth and seventh embodiments, for which reason reference is made here to the corresponding previous description.

As a logical switch, abbreviated here as TYP1, the eighth embodiment, like the fifth, sixth and seventh embodiments, can be described by the equation:

$$E1 \rightarrow A1 \text{ OR } A2$$

Here, in abbreviated form:
E1=Input1, 81
A1=Output1, 82
A2=Output2, 83

Ninth Embodiment

Figure 9:
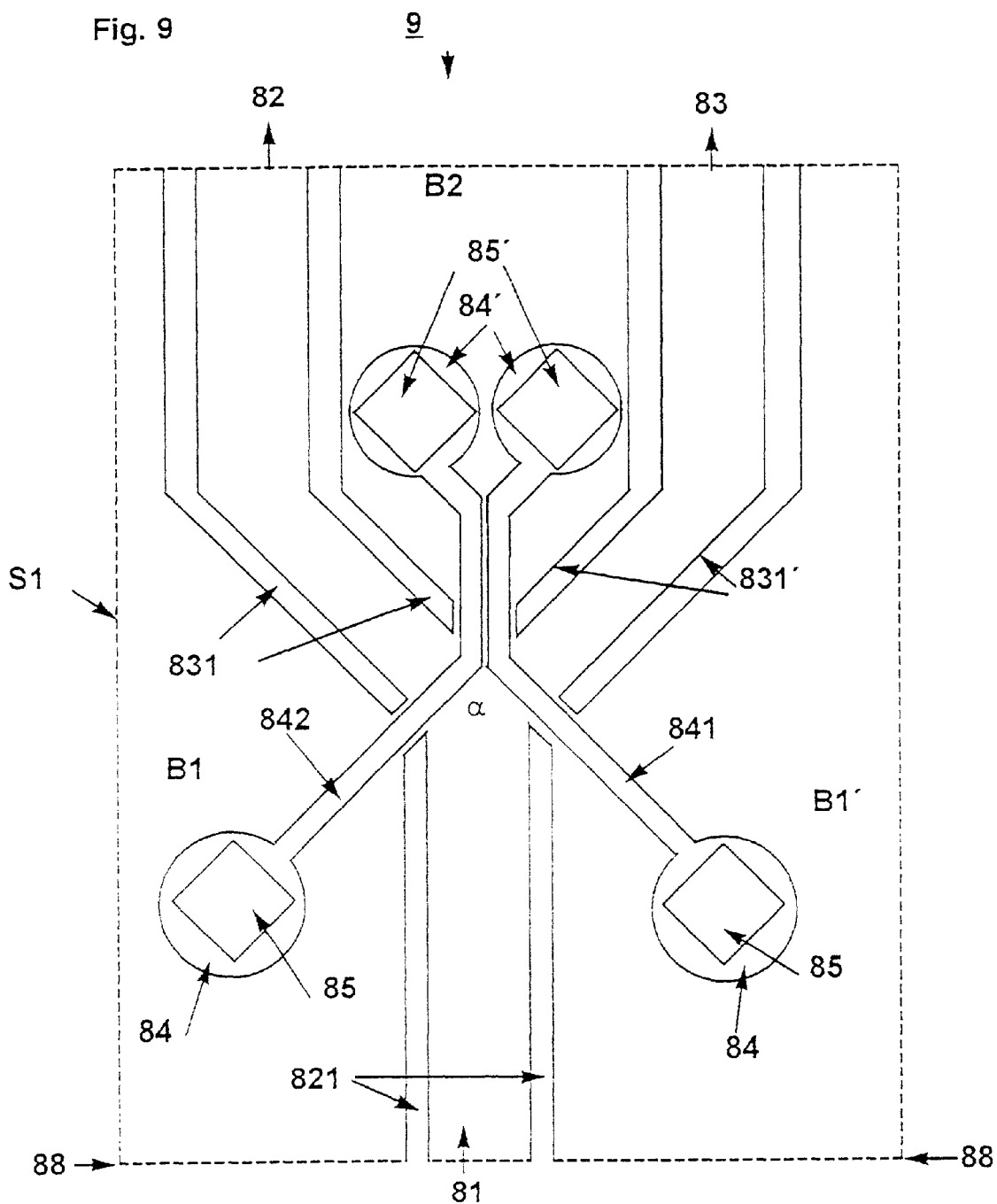
FIG. 9 shows a ninth embodiment of the present invention (a modification of the sixth embodiment of the invention)

FIG. 9 shows a ninth embodiment of the present invention, a combination of the eighth embodiment with the sixth embodiment, similar structural elements being identified in the drawing by the same reference symbols as in FIG. 8. The design and arrangement of the trenches 821, 831 and 831' of the ninth embodiment correspond essentially to the eighth embodiment, with the difference that the gap between the inner trenches 831, 831' is somewhat larger than twice the width of a channel 841, 842. As in the case of the eighth embodiment, a cavity 84, 84 is in each case formed on both sides of the trenches 821, 821, in the areas B1 and B1' of the substrate S1, and from each of the cavities 84, 84 a channel 841, 842 leads in each case through the corresponding gap between the outer trenches 821, 831 and 821, 831' as far as the gap between the inner trenches 831, 831', so that the two channels 841 and 842 are arranged adjacently. Differing from the eighth embodiment, however, the channels 841, 842 are not connected to each other but lead separately from each other through the gap between the inner trenches 831, 831' into the area B2 of the substrate S1, to cavities 84' and 84' which are arranged there and whose design corresponds to the cavities 84. In this way, according to the invention, two mutually independent systems, cavity 84', channel 841, cavity 84, and cavity 84', channel 842, cavity 84 are provided, and in each case a microactuator is arranged optionally above one or both cavities 84, 84'.

As in the sixth and eighth embodiments, a first suitable liquid and a second suitable liquid and/or a suitable gas are introduced into the systems comprising cavity, channel and cavity; and in this regard and in relation to the functioning of the ninth embodiment, reference is made to the description of the sixth and eighth embodiments.

As a logical switch, abbreviated here by TYP1, the ninth embodiment, like the fifth, sixth, seventh and eighth embodiments, can be described by the equation:

$$E1 \rightarrow A1 \text{ OR } A2$$

Here, in abbreviated form:
E1=Input1, 81
A1=Output1, 82
A2=Output2, 83

Tenth Embodiment

Figure 10A:
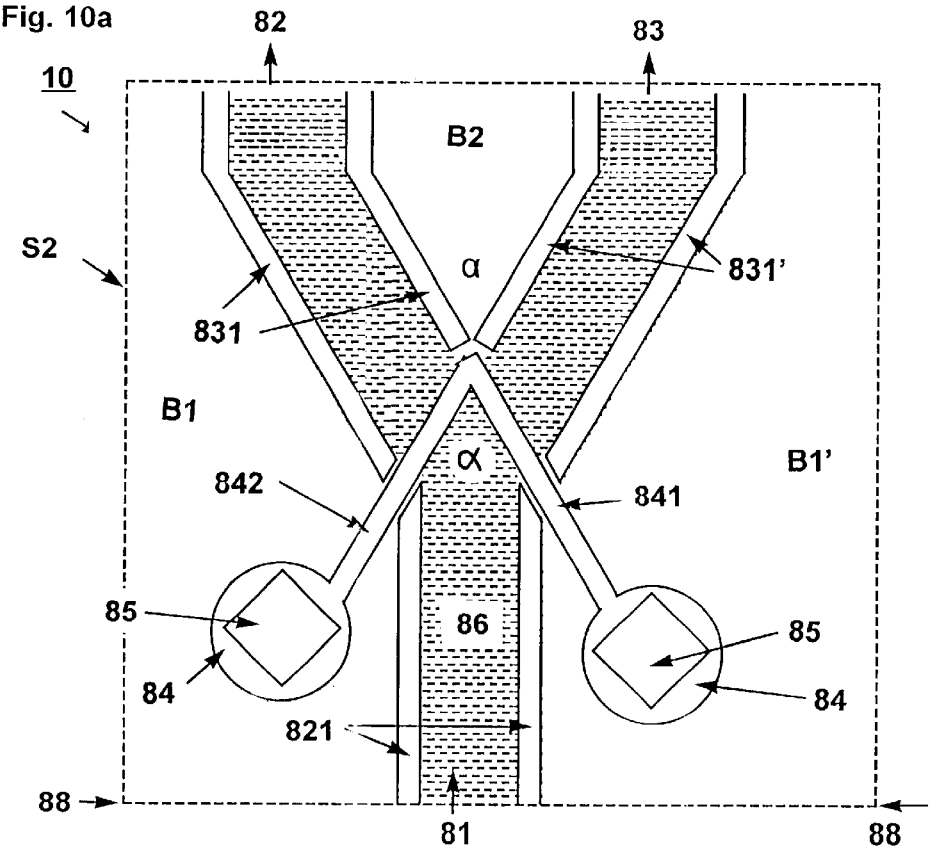
FIGS. 10a and b show a tenth embodiment of the present invention (modifications of the eighth embodiment of FIG. 8)

FIG. 10a shows a tenth embodiment of the present invention, a modification of the eighth embodiment of FIG. 8b. Instead of the trenches 821, 831 and 831', or as an optical waveguide between the trenches 821, 831 and 831', the optical waveguides 86 are here introduced optionally into a suitably prestructured substrate S2, as in the seventh embodiment. The substrate S2 of the tenth embodiment of the present invention is therefore advantageously selected in such a way that its optical properties are considerably different from the optical properties of the optical waveguide 86.

The remaining arrangement of the structural elements of the tenth embodiment corresponds to the corresponding elements of the eighth embodiment. The relevant elements are identified by corresponding reference symbols in FIG. 10, and reference is made to the corresponding description of the eighth embodiment.

The advantage of the tenth embodiment according to FIG. 10a over the eighth embodiment is that the material selection of the substrate S2 and of the optical waveguide 86 can be made more flexibly, which permits advantages in terms of costs and facilitates the fine matching of the design to predetermined applications with specific functional requirements.

The advantage of the eighth embodiment over the tenth embodiment according to FIG. 10a resides in the above-described, particularly simple and cost-effective manufacture, even in mass production in batch operation.

Figure 10B:
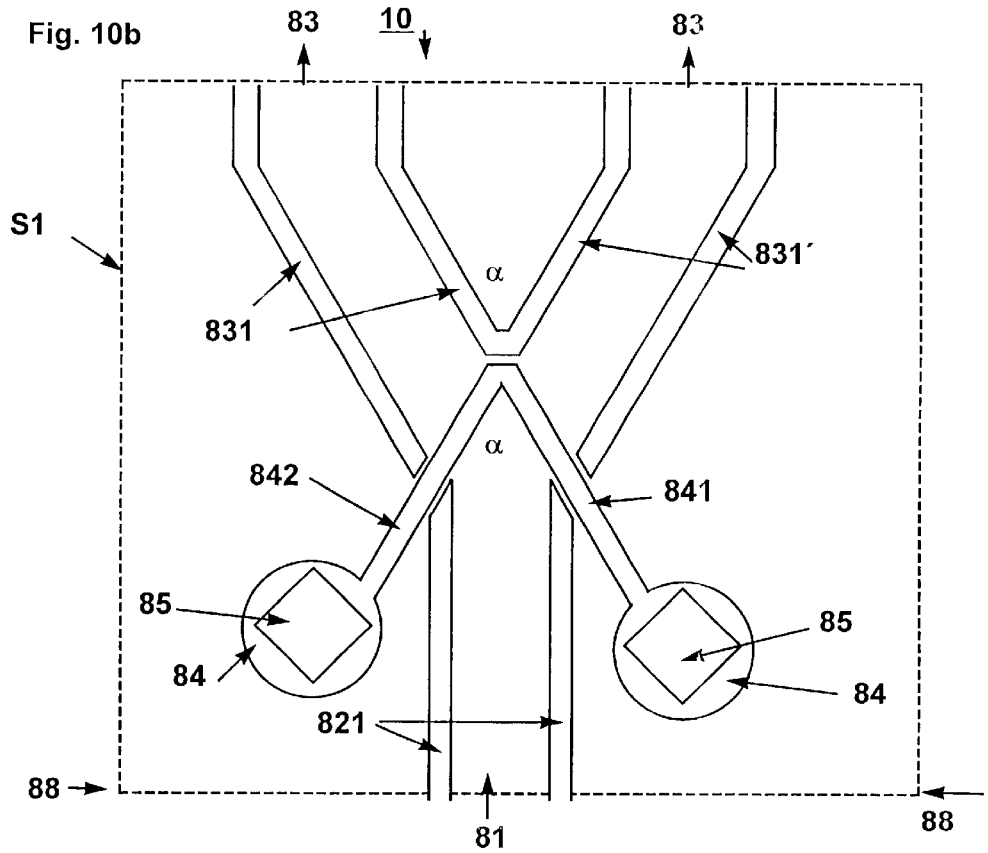

FIG. 10b shows the optical switch 10 according to the invention, a further modification of the eighth embodiment of FIG. 8b, which differs from the eighth embodiment in that the inner trenches 831, 831' are connected to each other. Otherwise, reference is made to the description of the eighth embodiment.

Eleventh Embodiment

Figure 11:
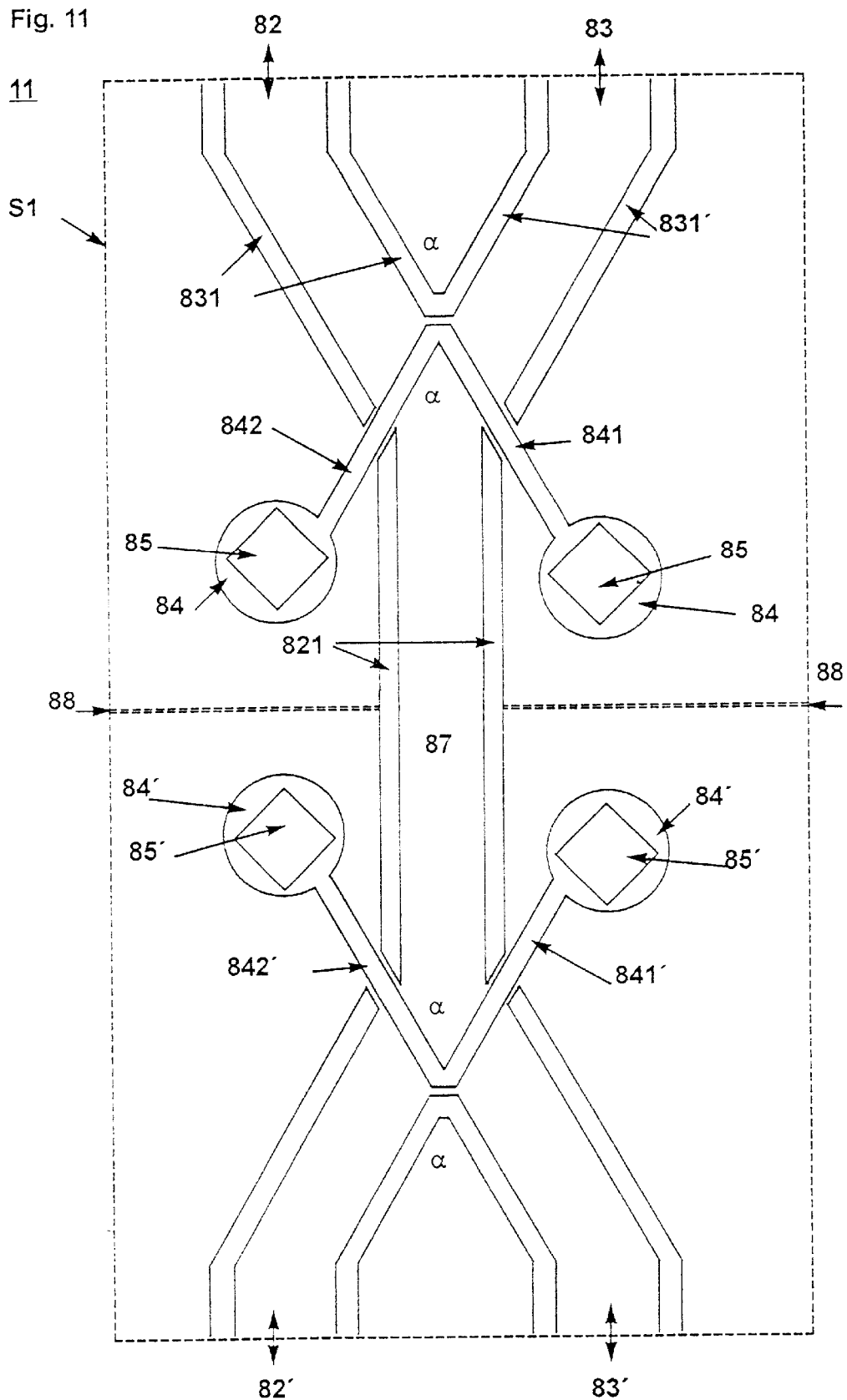
FIG. 11 shows an eleventh embodiment of the present invention (a further modification of the eighth embodiment)

FIG. 11 shows an eleventh embodiment 11 of the present invention, a modification of the tenth embodiment of FIG. 10b.

The eleventh embodiment likewise provides an optical switch 11 and comprises the combination of two switches 10 according to FIG. 10b, which are combined at the edge 88 of the light inputs 81, so that the trenches 821 and the light inputs 81 are arranged opposite each other, and the central light-conducting area 87 is formed. The eleventh embodiment therefore constitutes the combination of two embodiments according to FIG. 10b, and with regard to the functioning, reference is made to the relevant description of the eighth and tenth embodiments, identical elements in FIGS. 8, 10 and 11 having identical reference symbols. It is clear that the elongate central area 87 which conducts light waves can also be designed to be very shortened, so that the waveguides here are arranged in an X shape in the substrate S1, and so that the optical switch 11 is likewise formed essentially in one piece.

As distinct from the eighth embodiment and the tenth embodiment, the eleventh embodiment of the present invention has two light inputs 82 and 83 and two light outputs 82' and 83', incoming and outgoing light likewise being advantageously oriented essentially parallel in each case, and in this regard, and in regard to the other advantages, reference is made to the eighth and tenth embodiments, which likewise apply in full to the eleventh embodiment.

By means of suitable switching of the optionally two actuators 85 and 85' or four actuators 85, 85 and 85', 85', the following switching operations are possible with the eleventh embodiment:

First light path: 82, 87, 82'
Second light path: 82, 87, 83'
Third light path: 83, 87, 82'
Fourth light path: 83, 87, 83'

As a logical switch, here abbreviated by TYP2, the eleventh embodiment can be described by the system of equations:

$$E1 \rightarrow (A1 \text{ OR } A2) \text{ AND } E2 = \text{OUT}$$

$$E2 \rightarrow (A1 \text{ OR } A2) \text{ AND } E1 = \text{OUT}$$

Here, in abbreviated form:
E1=Input1, 82
E2=Input2, 83
A1=Output1, 82'
A2=Output2, 83'

Twelfth Embodiment

Figure 12:
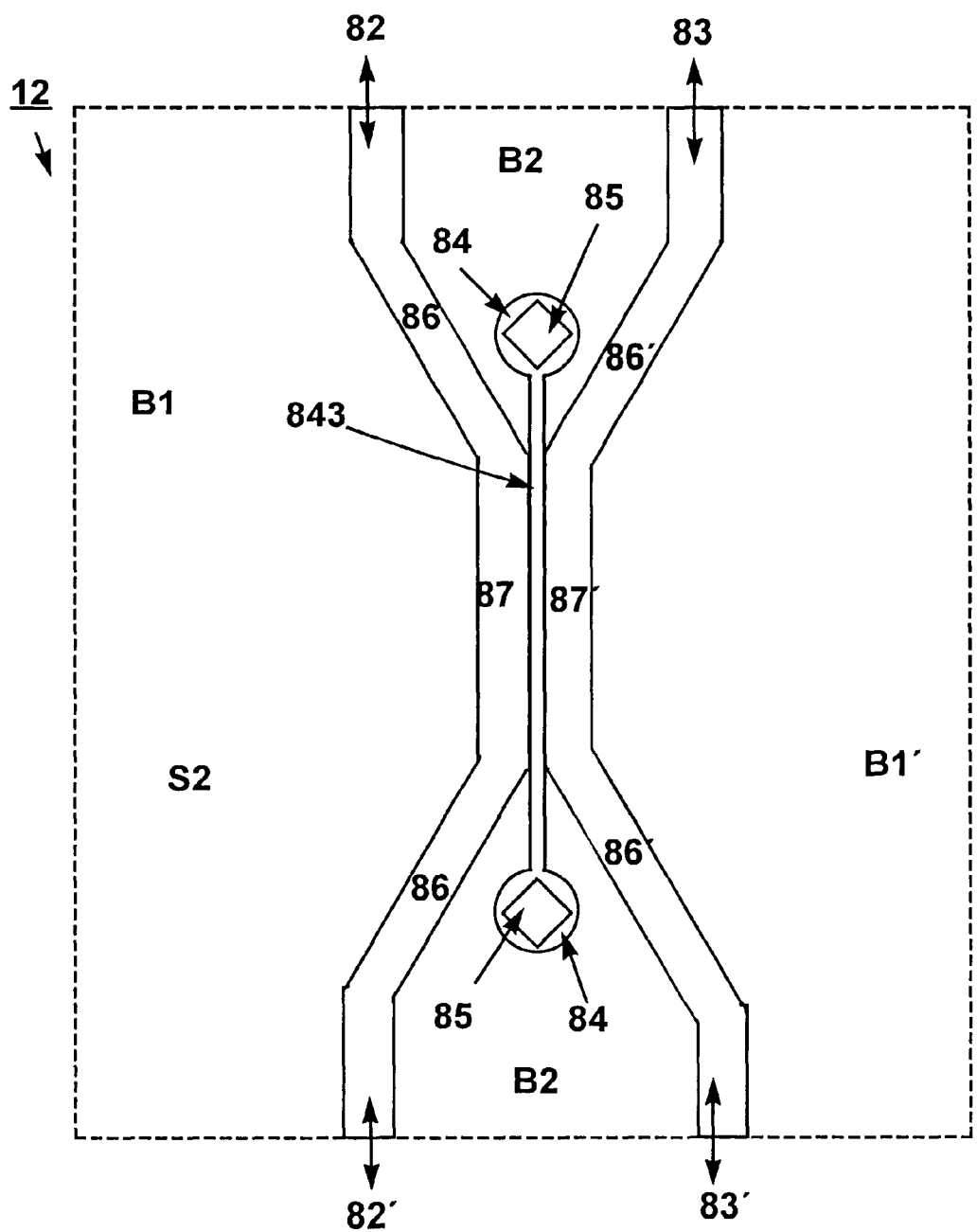
FIG. 12 shows a twelfth embodiment of the present invention (a modification of the eleventh embodiment)

FIG. 12 shows a twelfth embodiment of the present invention, a modification of the eleventh embodiment.

Here, as in the ninth and seventh embodiments, the optical waveguides 86, 87, 86 and 86', 87', 86' are optionally introduced into a suitably pre-structured substrate S2 instead of the trenches 821, 831 and 831' or as the optical waveguide between the trenches 821, 831 and 831'. With regard to the material selection for the substrate S2 and the optical waveguides, the twelfth embodiment therefore has the same advantages as the tenth embodiment.

The arrangement of the structural elements of the twelfth embodiment corresponding to the corresponding elements of the eleventh embodiment are identified by corresponding reference numbers in FIG. 12, and reference is made to the corresponding description of the eighth and eleventh embodiments.

The optical switch 12 differs from the optical switch 11 in that the central light-conducting area 87 parallel to the direction of propagation of the light is subdivided by the channel 843 into two parallel optical waveguides 87, 87', the channel 843 interconnecting two cavities 84, 84', and a microactuator 85, 85' being optionally arranged above one or both cavities 84, 84'. As distinct from the case of the optical switch 11, here the cavities 84, 84' and the actuators 85, 85' are arranged in the area B2 of the substrate S2 between the forking optical waveguides 86 and 86'. A liquid F with a suitable refractive index is likewise introduced partially into the system comprising cavity 84, channel 843 and cavity 84', and the liquid F can optionally be introduced into the channel 843 or removed from the channel 843 by suitable switching of the actuators 85, 85'.

According to the invention, the optical switch 11 therefore provides two light paths 82, 82' and 83, 83', which are separated in a central area of the substrate S2 only by the channel 843, and which can be switched as described below:

Introduced into the channel 843 is a liquid F with a suitable refractive index, which essentially corresponds to the refractive index of the optical waveguides 86, 87 and 86', 87'. The result is that the light input 82 is connected to both light outputs 82' and 83'.

Introduced into the channel 843 is a liquid F or a gas with a suitable refractive index, which differs considerably from the refractive index of the optical waveguides 87 and 87'. The result is a first and second, mutually decoupled light path with a first input 82 and a first output 82' and with a second input 83 and a second output 83'.

As a logical switch, abbreviated here by TYP3, the twelfth embodiment can be described by the system of equations:

$E1 \rightarrow A1$ AND $E2 = A2$ $E1 \rightarrow (A1$ AND $A2)$ AND $E2 \rightarrow (A1$ AND $A2)$ Here, in abbreviated form:

E1=Input1, 82
E2=Input2, 83
A1=Output1, 82'
A2=Output2, 83'

The optical switch 12 according to the invention has, in terms of its other features, the same advantages as the above-described optical switches 5 to 10, and therefore in this regard reference is made to that which was said previously.

Thirteenth Embodiment

Figure 13:
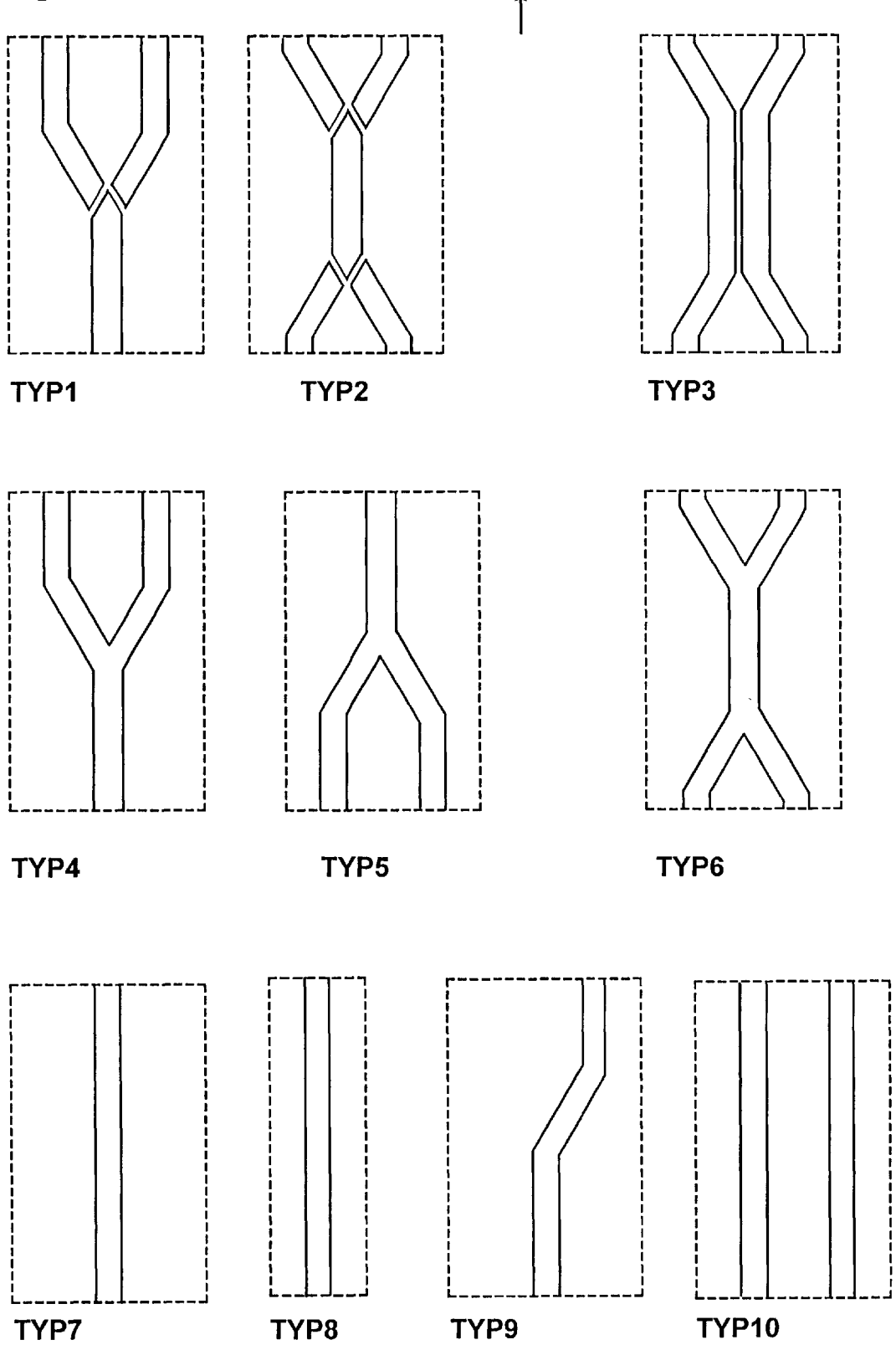
FIG. 13 shows an optical system according to the invention, comprising circuit components in each case designed to implement a logical switching operation and, in addition, comprising monofunctional components.
Figure 14:
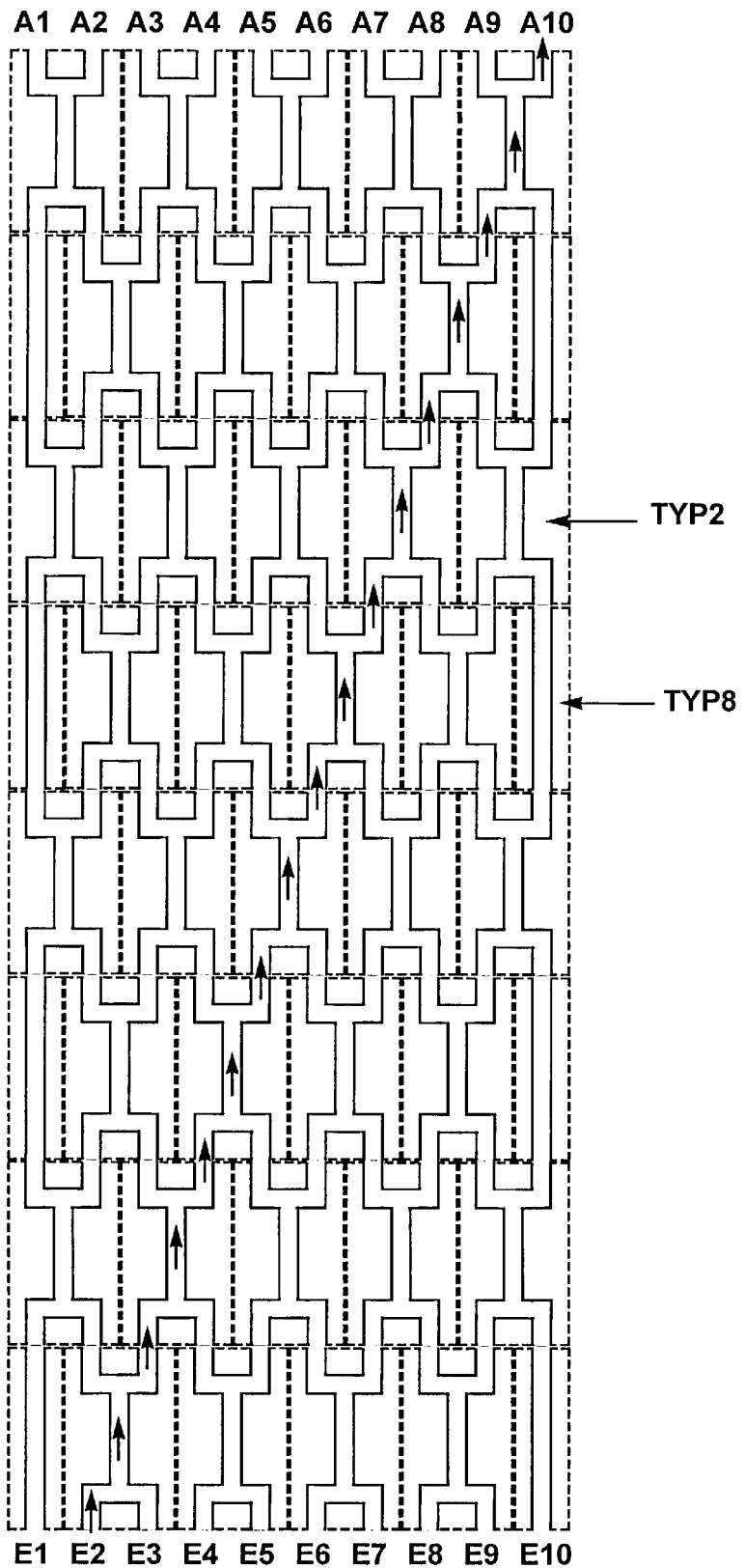
FIG. 14 shows an exemplary circuit arrangement, provided with components, of the system of FIG. 13.

FIG. 13 shows a modular system according to the invention for the construction of optical switching systems comprising the above-described basic switching elements TYP1 and TYP2 and, advantageously, additionally comprising the basic switching element TYP3 and, advantageously, additionally comprising the monofunctional basic switching elements TYP4 and TYP5 and, advantageously, comprising further monofunctional elements TYP6, TYP7, TYP8, TYP9 and TYP10.

The basic switching elements TYP1 to TYP10 (illustrated only schematically/symbolically in the drawing) are matched to one another in terms of their dimensions, according to the invention, so that they can be combined with one another in a simple way: according to the invention, all the elements comprise essentially planar optical waveguides with at least one light input E1 and at least one light output A1, which are arranged in such a way that light input and light output are arranged essentially parallel in one plane.

In detail, the basic switching elements TYP1 to TYP10 permit the following functions:

TYP1: One input and two outputs

Switching: $E1 \rightarrow A1$ OR $A2$

TYP2: Two inputs and two outputs

Switching: $E1 \rightarrow (A1$ OR $A2)$ AND $E2$=OUT $E2 \rightarrow (A1$ OR $A2)$ AND $E1$=OUT TYP3: Two inputs and two outputs Switching: $E1 \rightarrow A1$ AND $E2 \rightarrow A2$ $E1 \rightarrow (A1$ AND $A2)$ AND $E2 \rightarrow (A1$ AND $A2)$ TYP4: One input and two outputs, monofunctional Switching: $E1 \rightarrow A1$ AND $A2$ TYP5: Two inputs and one output, monofunctional Switching: $E1 \rightarrow A1$ AND $E2 \rightarrow A1$ TYP6: Two inputs and two outputs, monofunctional Switching: $(E1 \rightarrow A1$ AND $A2)$ AND $(E2 \rightarrow A1$ AND $A2)$ TYP7: One input and one output, monofunctional Switching: $E1 \rightarrow A1$ TYP8: One input and one output, monofunctional Switching: $E1 \rightarrow A1$ TYP9: One input and one output, monofunctional Switching: $E1 \rightarrow A1$, (lateral offset of $E1$ and $A1$)

TYP10: Two inputs and two outputs, monofunctional

Switching: $E1 \rightarrow A1$ AND $E2 \rightarrow A2$

E1, E2, A1, A2 are used here as abbreviations for Input1, Input2, Output1 and Output2, and "$\rightarrow$" means "connected to".

In industrial production, by using known microstructuring methods, the modular components TYP1 to TYP10 according to the invention can be manufactured cost-effectively in large numbers in batch operation, and subsequently, by means of suitable selection and combination of the prefabricated components, can be combined to form a circuit with a predetermined switching function.

Particularly advantageously, the modular system according to the invention, comprising at least the basic components TYP1 and TYP2 may be a constituent part of a data-processing program for controlling a plant for the production of the individual components or more complex circuit arrangements of chip design, even in batch operation. The basic components TYP1 and TYP2, advantageously also TYP3, advantageously additionally the components TYP4, TYP5 and TYP6, advantageously additionally the components TYP7, TYP8, TYP9, TYP10, are in this case according to the invention, as virtual components, a constituent part of a data-processing program which advantageously both predefines and optimizes the design of complex optical circuits, and also controls their subsequent automated production.

FIG. 13 shows, as an example, a circuit by means of which the light inputs E1 to E10 can optionally be connected to one of the light outputs A1 to A10, and which is provided by means of a suitable arrangement of the basic switching elements TYP2 and TYP8.

The substrate in all the above-described embodiments 1 to 13 suitably consists of a material with preferably hydrophobic properties.

What is claimed is:

1. An optical switch comprising a basic body (2, 3, 5, 6, 7, 8, 9, 10, 11, 12) with at least one light input and at least two light outputs, so that at least a first and a second light path are provided, which form a first angle ($\alpha$);

at least one channel which interrupts the light paths is formed in the basic body (2, 3, 5, 6, 7, 8, 9, 10, 11, 12);

introduced partially into the channels is a medium with a refractive index that is essentially identical to the refractive index of the light paths, and at least one means (24, 44, 55, 65, 75, 85) of displacing the medium within the channels is provided;

the channels are connected to cavities (201, 401, 54, 64, 74, 84) whose cross sections are comparatively large as compared with the cross sections of the channels;

defined by the following:

the means of displacing the medium is a microactuator;
the channels have a first and a second section (541, 542; 641, 642; 731, 732; 841, 842); and the first section extends at a second angle ($\alpha$) with respect to the direction of propagation of the light through the first light path and along a boundary of the second light path, and the second section extends at a third angle ($\alpha$) with respect to the direction of propagation of the light through the second light path and along a boundary of the first light path.

2. The optical switch as claimed in claim 1, wherein the medium is a liquid or a gas, and the means (24, 44, 55, 65, 75, 85) is a piezoelectric actuator or a thermal actuator.

3. The optical switch as claimed in claim 1 or 2, wherein the basic body (2, 3, 4, 5, 6, 7, 8, 9, 10, 11, 12) is of planar design and the light inputs are arranged parallel to the light outputs, and the first section (541, 641, 731, 841) of the channel and the second section (542; 642; 732; 842) of the channel form a fourth angle ($\alpha$) whose magnitude is essentially identical to the first angle ($\alpha$).

4. The optical switch as claimed in one of claims 1 to 2 wherein the cavities (201, 401, 54, 64, 74, 84) are optionally filled with the liquid or with air.

5. The optical switch as claimed in one of the preceding claims 1 to 2, wherein the actuator (24, 44, 55, 65, 75, 85) is arranged above a cavity (201, 401, 54, 64, 74, 84), and wherein the cavities (201, 401, 54, 64, 74) above which an actuator (24, 44, 55, 65, 75) is arranged are filled with the liquid.

6. The optical switch as claimed in one of the preceding claims 1 to 2, wherein the basic body (2, 3, 5, 6, 7, 8, 9, 10, 11, 12) consists of a light-conducting material with a refractive index that is essentially identical to the refractive index of the light paths, and the light paths are provided in each case by two opposite trenches formed in the basic body (2, 3, 5, 6, 7, 8, 9, 10, 11, 12).

7. The optical switch as claimed in one of the preceding claims 1 to 2, wherein the basic body (2, 3, 5, 6, 7, 8, 9, 10, 11, 12) consists of a preferably hydrophobic material which has a refractive index which is considerably different from the refractive index of the light paths, and the light paths consist of light-conducting fibers which are arranged in the basic body (2, 3, 5, 6, 7, 8, 9, 10, 11, 12).

8. The optical switch as claimed in claim 6, wherein the basic body (2, 3, 5, 6, 7) consists of preferably hydrophobic plastic, glass or silicon.

9. The optical switch as claimed in claim 7, wherein the light-conducting fibers are polymer waveguides or glass-fiber conductors.

10. A modular system for the construction of optical circuits comprising more than one modular basic switching element, provided by means of suitably designed optical switches as claimed in one of claims 1 to 2, wherein the modular system comprises at least the two basic switching elements and the basic switching elements are arranged in cascade in one plane: with one input and two outputs (TYP1), and with two inputs and two outputs (TYP2).

* * * * *